United States Patent
Jin et al.

(10) Patent No.: US 11,624,419 B2
(45) Date of Patent: Apr. 11, 2023

(54) MAGNETIC SUSPENSION TYPE QUASI-ZERO STIFFNESS ELECTROMAGNETIC VIBRATION ISOLATOR WITH ACTIVE NEGATIVE STIFFNESS

(71) Applicant: Harbin Engineering University, Harbin (CN)

(72) Inventors: Guoyong Jin, Harbin (CN); Junjie Yuan, Harbin (CN); Tiangui Ye, Harbin (CN); Zhigang Liu, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 183 days.

(21) Appl. No.: 17/237,106

(22) Filed: Apr. 22, 2021

(65) Prior Publication Data
US 2021/0246964 A1    Aug. 12, 2021

(30) Foreign Application Priority Data
Dec. 28, 2020    (CN) .......................... 202011589226.1

(51) Int. Cl.
*F16F 15/03*    (2006.01)
*F16F 15/02*    (2006.01)

(52) U.S. Cl.
CPC .......... *F16F 15/03* (2013.01); *F16F 15/022* (2013.01); *F16F 2222/06* (2013.01); *F16F 2228/06* (2013.01)

(58) Field of Classification Search
None
See application file for complete search history.

(56) References Cited

U.S. PATENT DOCUMENTS

| 10,422,397 B1 * | 9/2019 | McKnight | F16F 1/027 |
| 2020/0136464 A1 * | 4/2020 | Post | F16F 15/315 |

FOREIGN PATENT DOCUMENTS

| CN | 108533669 A | * | 9/2018 | F16F 15/03 |
| CN | 112128285 A | * | 12/2020 | E04H 9/02 |

* cited by examiner

*Primary Examiner* — Melanie Torres Williams
(74) *Attorney, Agent, or Firm* — IPro, PLLC

(57) ABSTRACT

The disclosure provides a magnetic suspension type quasi-zero stiffness electromagnetic vibration isolator with active negative stiffness. The disclosure relates to the technical field of vibration control. The disclosure can selectively realize passive negative stiffness and active negative stiffness by adjusting the control mode of a controller. By adopting an amplifying mechanism and DIESOLE type electromagnets, the bearing capacity of the vibration isolator is further increased, and the disclosure is suitable for the field of ultra-low frequency heavy load vibration reduction and isolation. The displacement state of a negative stiffness mechanism can be measured in real time according to a sensor, and by means of cooperation of the controller and a driver, active negative stiffness is realized, real-time linear negative stiffness is realized, the multi-stable phenomenon is avoided, and complex dynamic phenomena such as jumping during working of the vibration isolator are prevented. The active negative stiffness is realized, the current passing through the system can be adjusted according to different working conditions, and the system has strong self-adaptive ability, can be applied to vibration-isolated objects of different quality, and can adapt to different working environments.

6 Claims, 17 Drawing Sheets

MAGNETIC SUSPENSION TYPE QUASI-ZERO STIFFNESS ELECTROMAGNETIC VIBRATION ISOLATOR WITH ACTIVE NEGATIVE STIFFNESS

TECHNICAL FIELD

The disclosure relates to the technical field of vibration control, and particularly relates to a magnetic suspension type quasi-zero stiffness electromagnetic vibration isolator with active negative stiffness.

BACKGROUND

As an important technical means to attenuate vibration and reduce noise, the vibration isolation technology aims to take certain measures between a vibration source and a system, and install appropriate vibration damping or vibration isolation apparatuses to isolate the direct transmission of vibration. In theory, traditional passive vibration isolators can only attenuate the vibration of which the excitation frequency is greater than $\sqrt{2}$ times the inherent frequency of the system. Furthermore, after system design and shaping, the stiffness and damping are fixed, and the self-adaptive ability is poor. Therefore, in the field of low-frequency vibration isolation, the quasi-zero stiffness vibration isolation technology has received more and more attention in recent years.

Except for a few examples of realizing quasi-zero stiffness according to the special properties of materials, quasi-zero stiffness vibration isolators are mostly composed of positive and negative stiffness structures in parallel. Positive stiffness elements (such as springs and the like) provide static support capacity, and negative stiffness offsets positive stiffness to realize quasi-zero stiffness. When a vibration isolation system is displaced from a static balance position, a positive stiffness spring restrains the trend of movement in this direction, and a negative stiffness mechanism strengthens the trend of movement in this direction. By connecting the positive stiffness spring and the negative stiffness mechanism in parallel, the overall stiffness of the system can be reduced to be close to or equal to zero; high static stiffness and low dynamic stiffness are realized at the same time; the vibration isolation frequency band is greatly expanded; and the problem of low-frequency vibration isolation can be solved well.

As the key point of the quasi-zero stiffness technology, the implementation manner of the negative stiffness directly determines the overall performance of the vibration isolation system. In recent years, among many mechanisms for realizing negative stiffness, the maximum negative stiffness and working range that can be realized by the mechanism represent the static load capacity and self-adaptability of the quasi-zero stiffness vibration isolator respectively; in the existing mechanisms, the implementation manners of negative stiffness mechanisms are mostly passive and semi-active, and due to the limitation of the implementation manners, these two parameters often conflict.

SUMMARY

The disclosure provides a magnetic suspension type quasi-zero stiffness electromagnetic vibration isolator with active negative stiffness. The disclosure provides the following technical solution:

A magnetic suspension type quasi-zero stiffness electromagnetic vibration isolator with active negative stiffness is provided, and the electromagnetic vibration isolator includes an actuator and an electric control part.

The actuator includes a bottom plate, a rotor assembly, a stator assembly, a spring assembly and a support plate; the bottom plate supports the rotor assembly and the stator assembly; and the spring assembly connects the support plate and the stator assembly.

The electric control part includes a displacement sensor, a controller, a driver and a DC stabilized power supply; the displacement sensor is installed between the support plate and the bottom plate; and the DC stabilized power supply provides power for the displacement sensor, the controller and the driver respectively.

Preferably, the rotor assembly includes a left armature lower connecting rod base, a left armature lower connecting rod, a left armature upper connecting rod seat, a left armature, a left armature lower connecting rod seat, a left armature upper connecting rod, a left armature upper connecting rod footstock, a right armature upper connecting rod footstock, a right armature upper connecting rod, a right armature upper connecting rod seat, a right armature, a right armature lower connecting rod seat, a right armature lower connecting rod and a right armature lower connecting rod base.

The left armature upper connecting rod footstock is installed on the left side under the support plate; the left armature lower connecting rod base is installed on the left side above the bottom plate; the left armature upper connecting rod seat and the left armature lower connecting rod seat are respectively installed at the middle parts of the upper and lower ends of the left armature; one ends of the left armature upper connecting rod and the left armature lower connecting rod are respectively connected with the left armature upper connecting rod seat and the left armature lower connecting rod seat; the other ends of the left armature upper connecting rod and the left armature lower connecting rod are respectively connected with the left armature upper connecting rod footstock and the left armature lower connecting rod base; the right armature upper connecting rod footstock is installed on the right side under the support plate; the right armature lower connecting rod base is installed on the right side above the bottom plate; the right armature upper connecting rod seat and the right armature lower connecting rod seat are respectively installed at the middle parts of the upper and lower ends of the right armature; one ends of the right armature upper connecting rod and the right armature lower connecting rod are respectively connected with the right armature upper connecting rod seat and the right armature lower connecting rod seat; and the other ends of the right armature upper connecting rod and the right armature lower connecting rod are respectively connected with the right armature upper connecting rod footstock and the right armature lower connecting rod base.

Preferably, the stator assembly includes a left electromagnet assembly, a middle electromagnet assembly, a right electromagnet assembly, a front connecting plate and a rear connecting plate.

The left electromagnet assembly, the middle electromagnet assembly and the right electromagnet assembly are respectively installed between the base and the support plate; the left electromagnet assembly and the right electromagnet assembly are symmetrical about the middle electromagnet assembly; and the front connecting plate and the rear connecting plate are respectively installed to connect the front and rear sides of the left electromagnet assembly and the right electromagnet assembly together.

Preferably, the left electromagnet assembly includes a left electromagnet fixing seat, a left shaft fixing sleeve, a left guide shaft, two left electromagnet support springs, a left linear bearing, a left electromagnet adjusting seat, a left front lever support seat, a left front short lever support, a left front long lever support, a left front short lever, a left front long lever, a left front lever connecting seat, a left front straight rod, a left front straight rod footstock, a left DIESOLE type electromagnet, a left rear straight rod footstock, a left rear straight rod, a left rear long lever, a left rear short lever, a left rear lever connecting seat, a left rear short lever support, a left rear long lever support and a left rear lever support seat; and the left DIESOLE type electromagnet includes a left electromagnet core, a left electromagnet outer coil, a left electromagnet inner coil and a left magnetorheological elastomer.

The left electromagnet fixing seat is installed on the base; the left shaft fixing sleeve is installed on the left electromagnet fixing seat; the left guide shaft is installed in the left shaft fixing sleeve; the left electromagnet adjusting seat is installed under the left DIESOLE type electromagnet; the left linear bearing is installed on the left electromagnet adjusting seat and is matched with the left guide shaft; and the two left electromagnet support springs are installed between the left electromagnet fixing seat and the left electromagnet adjusting seat and are symmetrical about the left guide shaft.

The left front straight rod footstock and the left rear straight rod footstock are respectively installed at the front and rear of the left side under the support plate; one ends of the left front straight rod and the left rear straight rod are respectively connected with the left front straight rod footstock and the left rear straight rod footstock; the other ends of the left front straight rod and the left rear straight rod are respectively connected with one ends of the left front short lever and the left rear short lever; the other ends of the left front short lever and the left rear short lever are respectively connected with one ends of the left front long lever and the left rear long lever; the other ends of the left front long lever and the left rear long lever are respectively connected with the left front lever connecting seat and the left rear lever connecting seat; the left front lever connecting seat and the left rear lever connecting seat are fixedly installed on the front and rear sides of the left DIESOLE type electromagnet respectively; the left front short lever support, the left front long lever support, the left rear short lever support and the left rear long lever support are installed in the corresponding positions of the left front short lever, the left front long lever, the left rear short lever and the left rear long lever; and the left front lever support seat and the left rear lever support seat are respectively installed under the left front short lever support, the left front long lever support, the left rear short lever support and the left rear long lever support to play a support role.

Preferably, the middle electromagnet assembly includes a middle shaft fixing sleeve, a middle guide shaft, a middle linear bearing, a middle front lever support seat, a middle front long lever support, a middle front short lever support, a middle front long lever, a middle front short lever, a middle front lever connecting seat, a middle front straight rod, a middle front straight rod footstock, a magnetic isolation block, a middle left DIESOLE type electromagnet, a middle rear lever support seat, a middle rear long lever support, a middle rear short lever support, a middle rear long lever, a middle rear short lever, a middle rear lever connecting seat, a middle rear straight rod, a middle rear straight rod footstock and a middle right DIESOLE type electromagnet.

The middle left DIESOLE type electromagnet includes a middle left electromagnet core, a middle left inner coil, a middle left outer coil and a middle left magnetorheological elastomer; and the middle right DIESOLE type electromagnet includes a middle right electromagnet core, a middle right inner coil, a middle right outer coil and a middle right magnetorheological elastomer.

The middle left DIESOLE type electromagnet and the middle right DIESOLE type electromagnet are respectively installed on the left and right sides of the magnetic isolation block; the middle guide shaft is installed in the middle shaft fixing sleeve; the middle shaft fixing sleeve is installed on the bottom plate; the middle linear bearing is installed under the magnetic isolation block and is matched with the middle guide shaft; the middle front straight rod footstock and the middle rear straight rod footstock are connected to the front and rear sides of the middle part under the support plate; one ends of the middle front straight rod and the middle rear straight rod are respectively connected with the middle front straight rod footstock and the middle rear straight rod footstock; the other ends of the middle front straight rod and the middle rear straight rod are respectively connected with one ends of the middle front short lever and the middle rear short lever; the other ends of the middle front short lever and the middle rear short lever are respectively connected with one ends of the middle front long lever and the middle rear long lever; the other ends of the middle front long lever and the middle rear long lever are respectively connected with the middle front lever connecting seat and the middle rear lever connecting seat; the middle front lever connecting seat and the middle rear lever connecting seat are fixedly installed on the front and rear sides of the magnetic isolation block respectively; the middle front short lever support, the middle front long lever support, the middle rear short lever support and the middle rear long lever support are respectively installed in the corresponding positions of the middle front short lever, the middle front long lever, the middle rear short lever and the middle rear long lever; and the middle front lever support seat and the middle rear lever support seat are respectively installed under the middle front short lever support, the middle front long lever support, the middle rear short lever support and the middle rear long lever support to play a support role.

Preferably, the right electromagnet assembly includes a right electromagnet fixing seat, a right shaft fixing sleeve, a right guide shaft, two right electromagnet support springs, a right linear bearing, a right electromagnet adjusting seat, a right front lever support seat, a right front short lever support, a right front long lever support, a right front short lever, a right front long lever, a right front lever connecting seat, a right front straight rod, a right front straight rod footstock, a right DIESOLE type electromagnet, a right rear straight rod footstock, a right rear straight rod, a right rear long lever, a right rear short lever, a right rear lever connecting seat, a right rear short lever support, a right rear long lever support and a right rear lever support seat.

The right DIESOLE type electromagnet includes a right electromagnet core, a right electromagnet outer coil, a right electromagnet inner coil and a right magnetorheological elastomer.

The right electromagnet fixing seat is installed on the base; the right shaft fixing sleeve is installed on the right electromagnet fixing seat; the right guide shaft is installed in the right shaft fixing sleeve; the right electromagnet adjusting seat is installed under the right DIESOLE type electromagnet; the right linear bearing is installed on the right electromagnet adjusting seat and is matched with the right guide shaft; the two right electromagnet support springs are installed between the right electromagnet fixing seat and the right electromagnet adjusting seat and are symmetrical about the right guide shaft; the right front straight rod footstock and the right rear straight rod footstock are respectively installed at the front and rear of the right side under the support plate; one ends of the right front straight rod and the right rear straight rod are respectively connected with the right front straight rod footstock and the right rear straight rod footstock; the other ends of the right front straight rod and the right rear straight rod are respectively connected with one ends of the right front short lever and the right rear short lever; the other ends of the right front short lever and the right rear short lever are respectively connected with one ends of the right front long lever and the right rear long lever; the other ends of the right front long lever and the right rear long lever are respectively connected with the right front lever connecting seat and the right rear lever connecting seat; the right front lever connecting seat and the right rear lever connecting seat are fixedly installed on the front and rear sides of the right DIESOLE type electromagnet respectively; the right front short lever support, the right front long lever support, the right rear short lever support and the right rear long lever support are installed in the corresponding positions of the right front short lever, the right front long lever, the right rear short lever and the right rear long lever; and the right front lever support seat and the right rear lever support seat are respectively installed under the right front short lever support, the right front long lever support, the right rear short lever support and the right rear long lever support to play a support role.

Preferably, the spring assembly includes four spring lower locating sleeves, four bearing springs, four spring upper locating sleeves, a middle-layer plate, four support columns, a middle-layer plate linear bearing, a finely-adjusted spring, a finely-adjusted spring pressure plate and a finely-adjusted nut.

The four spring lower locating sleeves are symmetrically installed at the periphery above the bottom plate respectively; the four spring upper locating sleeves are symmetrically installed at the periphery under the middle-layer plate respectively and correspond to the four spring lower locating sleeves; the four bearing springs are respectively disposed between the corresponding four spring lower locating sleeves and four spring upper locating sleeves; the four support columns are respectively installed at the periphery above the middle-layer plate; the middle-layer plate linear bearing is installed under the middle-layer plate and is matched with the middle guide shaft; the finely-adjusted spring is disposed on a middle locating column of the middle-layer plate; the spring pressure plate is disposed above the finely-adjusted spring; the finely-adjusted nut is disposed above the spring pressure plate and is in threaded fit with the middle guide shaft; and when the overall height of a system is adjusted, a hexagonal hole at the upper part of the finely-adjusted nut is rotated by a wrench.

The bottom plate, the middle-layer plate and the magnetic isolation block are all made of magnetic isolation materials. The left electromagnet core, the right electromagnet core, the left armature and the right armature are all made of high-permeability materials.

The bottom plate is installed on a foundation, and the displacement sensor is installed between the support plate and the bottom plate. During working, the DC stabilized power supply provides power for the displacement sensor, the controller and the driver respectively. When the load acting on the support plate vibrates, the displacement sensor transmits the detected system displacement data to the controller; the controller sends a related instruction to the driver according to the established control law; and after the driver amplifies a signal according to the instruction, the working current is input into the left DIESOLE type electromagnet or the right DIESOLE type electromagnet to drive the electromagnet to attract the left and right armatures to form a complete magnetic circuit, thereby realizing active linear electromagnetic negative stiffness. When the controller does not work, passive electromagnetic negative stiffness is realized.

The disclosure has the following beneficial effects:

The disclosure can selectively realize passive negative stiffness and active negative stiffness by adjusting the control mode of the controller. By adopting an amplifying mechanism and the DIESOLE type electromagnets, the bearing capacity of the vibration isolator is further increased, and the disclosure is suitable for the field of ultra-low frequency heavy load vibration reduction and isolation. The displacement of a negative stiffness mechanism can be measured in real time by the sensor, and by means of cooperation of the controller and the driver, active negative stiffness is realized, real-time linear negative stiffness is realized, the multi-stable phenomenon is avoided, and complex dynamic phenomena such as jumping during working of the vibration isolator are prevented. The active negative stiffness is realized, the current passing through the system can be adjusted according to different working conditions, and the system has strong self-adaptive ability, can be applied to vibration-isolated objects of different quality, and can adapt to multiple working environments. The active negative stiffness is realized, and different from a quasi-zero stiffness mechanism which adopts a passive electromagnetic negative stiffness mechanism, the working range is expanded, and the self-adaptability of the system is improved. Different from the characteristic of the passive electromagnetic negative stiffness mechanism that deviates from the balanced position after applying excitation, changes the magnitude of the air gaps and breaks the balance of bilateral electromagnetic forces to realize negative stiffness properties, the disclosure adopts an active negative stiffness mode to greatly reduce the energy required for realizing the same magnitude of negative stiffness, so that the required energy is saved. Furthermore, it also means that under the condition of moderate volume, the disclosure can realize larger negative stiffness, which has obvious advantages in applications of mobile facilities such as ships and vehicles.

The disclosure is simple in structure and easy to process, has good anti-swing performance, is simple and flexible in installation, and can be arbitrarily arranged on a controlled object or a base.

DETAILED DESCRIPTION

The disclosure is described in detail below with reference to specific examples.

Specific Example 1

Figure 1:
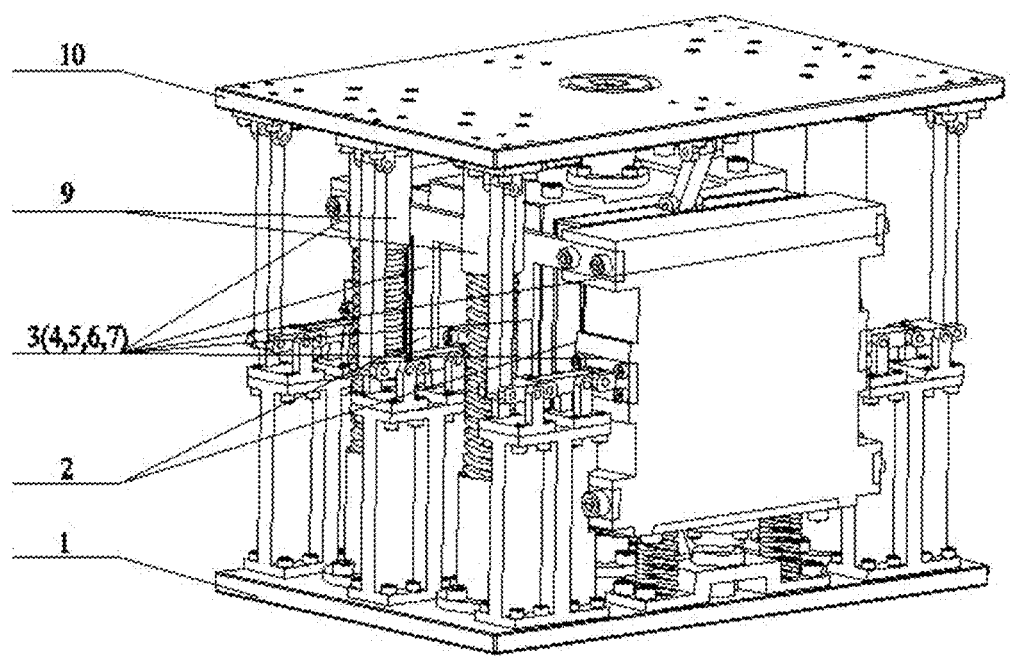
FIG. 1 is a schematic structural diagram of a magnetic suspension type quasi-zero stiffness electromagnetic vibration isolator with active negative stiffness.
Figure 2:
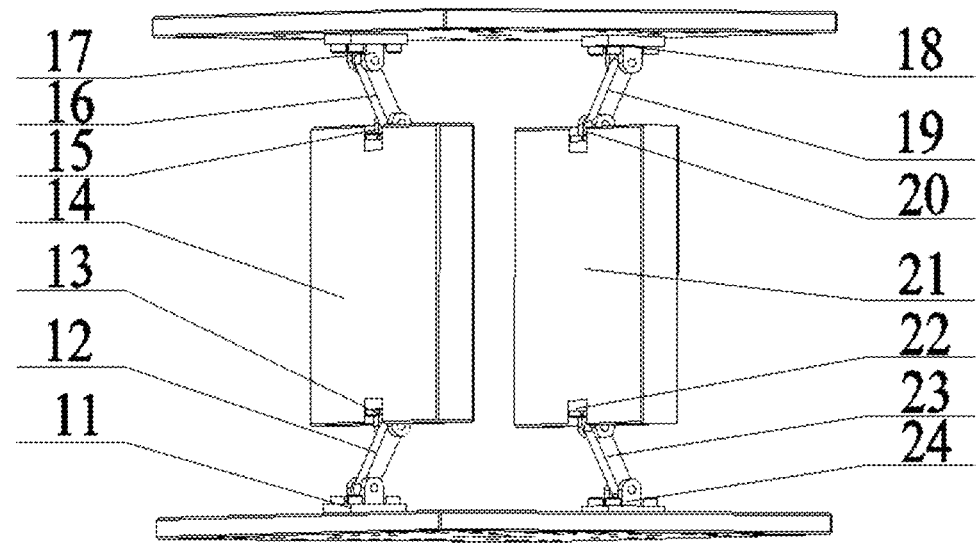
FIG. 2 is a schematic structural diagram of a rotor assembly.

According to FIG. 1 to FIG. 21, the disclosure provides a magnetic suspension type quasi-zero stiffness electromagnetic vibration isolator with active negative stiffness. As shown in FIG. 1, the magnetic suspension type quasi-zero stiffness electromagnetic vibration isolator capable of realizing active and passive negative stiffness, provided by the disclosure, includes an actuator part and an electric control part. The actuator part is composed of a base 1, a rotor assembly 2, a stator assembly 3 (including a left electromagnet assembly 4, a middle electromagnet assembly 5, a right electromagnet assembly 6, a front connecting plate 7 and a rear connecting plate 8), a spring assembly 9 and a support plate 10. The rotor assembly 2 and the stator assembly 3 together constitute an electromagnetic negative stiffness mechanism. The electric control part is composed of a displacement sensor 132, a controller 133, a driver 134 and a DC stabilized power supply 135. The specific structure and connection mode are as follows:

As shown in FIG. 2, the rotor assembly 2 is composed of a left armature lower connecting rod base 11, a left armature lower connecting rod 12, a left armature upper connecting rod seat 13, a left armature 14, a left armature lower connecting rod seat 15, a left armature upper connecting rod 16, a left armature upper connecting rod footstock 17, a right armature upper connecting rod footstock 18, a right armature upper connecting rod 19, a right armature upper connecting rod seat 20, a right armature 21, a right armature lower connecting rod seat 22, a right armature lower connecting rod 23 and a right armature lower connecting rod base 24. The left armature upper connecting rod footstock 17 is installed on the left side under the support plate 10; the left armature lower connecting rod base 24 is installed on the left side above the bottom plate 1; the left armature upper connecting rod seat 13 and the left armature lower connecting rod seat 15 are respectively installed at the middle parts of the upper and lower ends of the left armature 14; one ends of the left armature upper connecting rod 16 and the left armature lower connecting rod 12 are respectively connected with the left armature upper connecting rod seat 13 and the left armature lower connecting rod seat 15; the other ends of the left armature upper connecting rod 16 and the left armature lower connecting rod 12 are respectively connected with the left armature upper connecting rod footstock 17 and the left armature lower connecting rod base 24; the right armature upper connecting rod footstock 18 is installed on the right side under the support plate 10; the right armature lower connecting rod base 24 is installed on the right side above the bottom plate 1; the right armature upper connecting rod seat 20 and the right armature lower connecting rod seat 22 are respectively installed at the middle parts of the upper and lower ends of the right armature 21; one ends of the right armature upper connecting rod 19 and the right armature lower connecting rod 23 are respectively connected with the right armature upper connecting rod seat 20 and the right armature lower connecting rod seat 22; and the other ends of the right armature upper connecting rod 19 and the right armature lower connecting rod 23 are respectively connected with the right armature upper connecting rod footstock 18 and the right armature lower connecting rod base 24.

The stator assembly 3 is composed of the left electromagnet assembly 4, the middle electromagnet assembly 5, the right electromagnet assembly 6, the front connecting plate 7 and the rear connecting plate 8. The left electromagnet assembly 4, the middle electromagnet assembly 5 and the right electromagnet assembly 6 are respectively installed between the base 1 and the support plate 10; the left electromagnet assembly 4 and the right electromagnet assembly 6 are symmetrical about the middle electromagnet assembly 5; and the front connecting plate 7 and the rear connecting plate 8 are respectively installed to connect the front and rear sides of the left electromagnet assembly 4 and the right electromagnet assembly 6 together.

Figure 3:
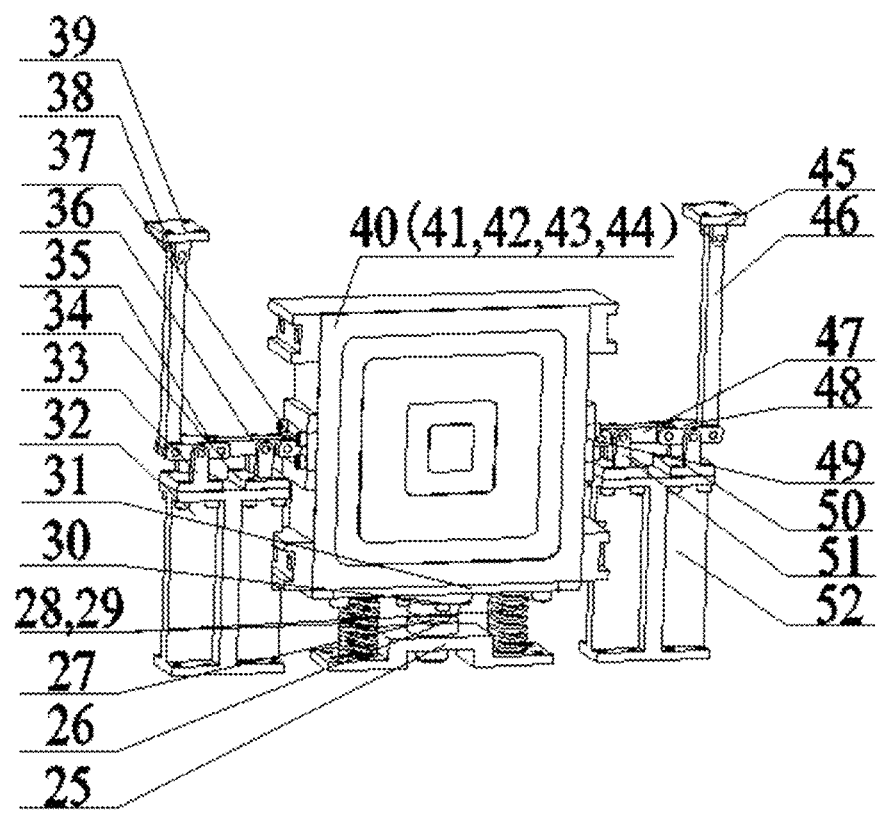
FIG. 3 is a schematic structural diagram of a left electromagnet assembly.
Figure 4:
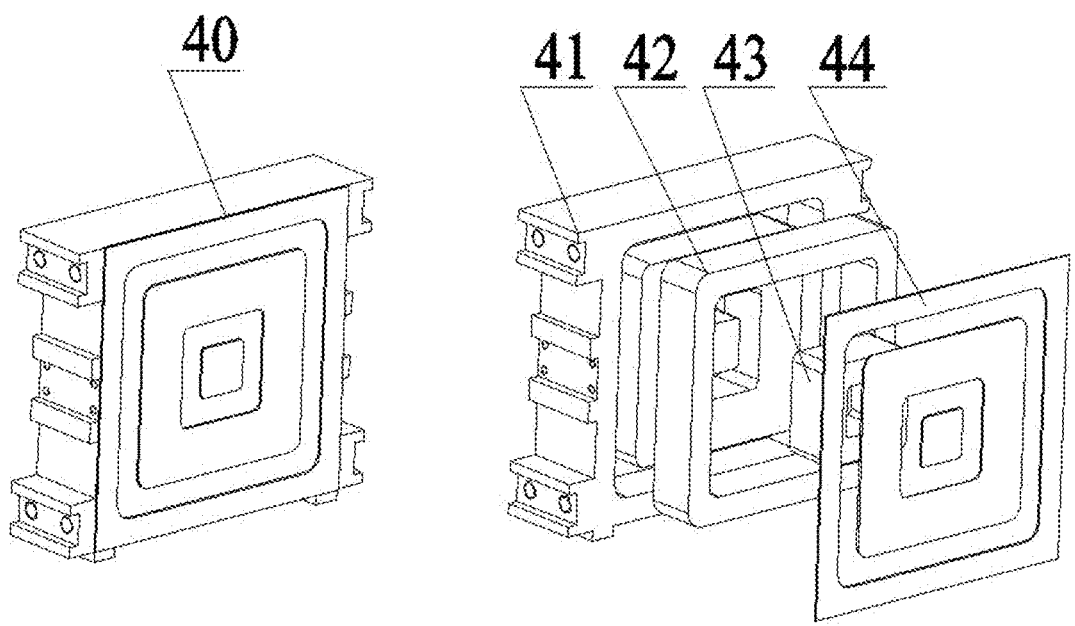
FIG. 4 is a schematic structural diagram of a left DIESOLE type electromagnet.

As shown in FIG. 3, the left electromagnet assembly 4 is composed of a left electromagnet fixing seat 25, a left shaft fixing sleeve 26, a left guide shaft 27, two left electromagnet support springs 28/29, a left linear bearing 30, a left electromagnet adjusting seat 31, a left front lever support seat 32, a left front short lever support 33, a left front long lever support 34, a left front short lever 35, a left front long lever 36, a left front lever connecting seat 37, a left front straight rod 38, a left front straight rod footstock 39, a left DIESOLE type electromagnet 40 (including a left electromagnet core 41, a left electromagnet outer coil 42, a left electromagnet inner coil 43 and a left magnetorheological elastomer 44, wherein the left electromagnet outer coil 42 and the left electromagnet inner coil 43 are respectively disposed in the corresponding positions in the left electromagnet core 41, and the left magnetorheological elastomer 44 is pasted on the surface of the left electromagnet core 41, as shown in FIG. 4), a left rear straight rod footstock 45, a left rear straight rod 46, a left rear long lever 47, a left rear short lever 48, a left rear lever connecting seat 49, a left rear short lever support 50, a left rear long lever support 51 and a left rear lever support seat 52. The left electromagnet fixing seat 25 is installed on the base 1; the left shaft fixing sleeve 26 is installed on the left electromagnet fixing seat 25; the left guide shaft 27 is installed in the left shaft fixing sleeve 26; the left electromagnet adjusting seat 31 is installed under the left DIESOLE type electromagnet 40; the left linear bearing 30 is installed on the left electromagnet adjusting seat 31 and is matched with the left guide shaft 27; and the two left electromagnet support springs 28/29 are installed between the left electromagnet fixing seat 25 and the left electromagnet adjusting seat 31 and are symmetrical about the left guide shaft 27. The left front straight rod footstock 39 and the left rear straight rod footstock 45 are respectively installed at the front and rear of the left side under the support plate 10; one ends of the left front straight rod 38 and the left rear straight rod 46 are respectively connected with the left front straight rod footstock 39 and the left rear straight rod footstock 45; the other ends of the left front straight rod 38 and the left rear straight rod 46 are respectively connected with one ends of the left front short lever 35 and the left rear short lever 48; the other ends of the left front short lever 35 and the left rear short lever 48 are respectively connected with one ends of the left front long lever 34 and the left rear long lever 47; the other ends of the left front long lever 34 and the left rear long lever 47 are respectively connected with the left front lever connecting seat 37 and the left rear lever connecting seat 49; the left front lever connecting seat 37 and the left rear lever connecting seat 49 are fixedly installed on the front and rear sides of the left DIESOLE type electromagnet 40 respectively; the left front short lever support 33, the left front long lever support 34, the left rear short lever support 50 and the left rear long lever support 51 are installed in the corresponding positions of the left front short lever 35, the left front long lever 36, the left rear short lever 48 and the left rear long lever 47; and the left front lever support seat 32 and the left rear lever support seat 52 are respectively installed under the left front short lever support 32, the left front long lever support 34, the left rear short lever support 50 and the left rear long lever support 51 to play a support role.

Figure 5:
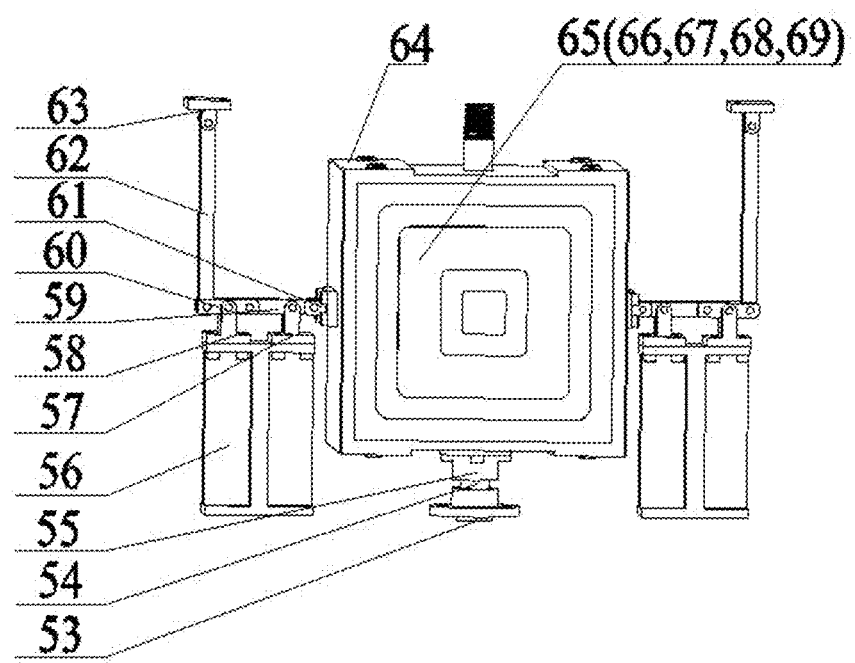
FIG. 5 is a left schematic structural diagram of a middle electromagnet assembly.
Figure 6:
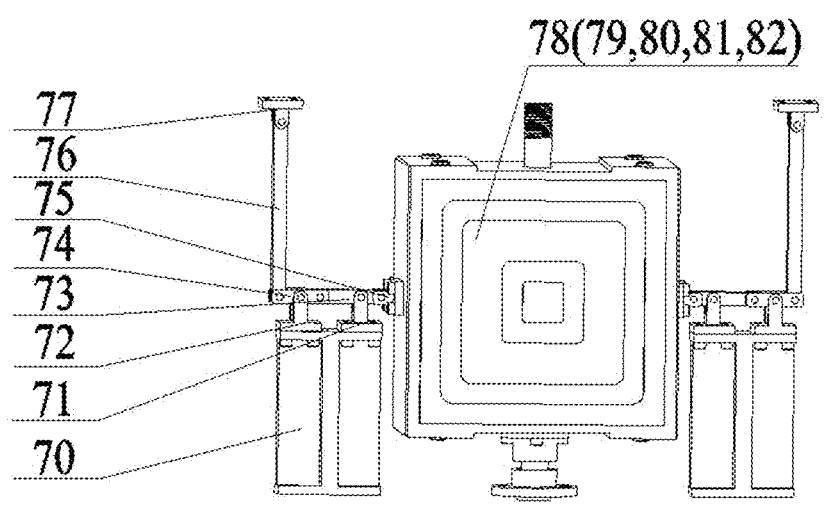
FIG. 6 is a right schematic structural diagram of a middle electromagnet assembly.
Figure 7:
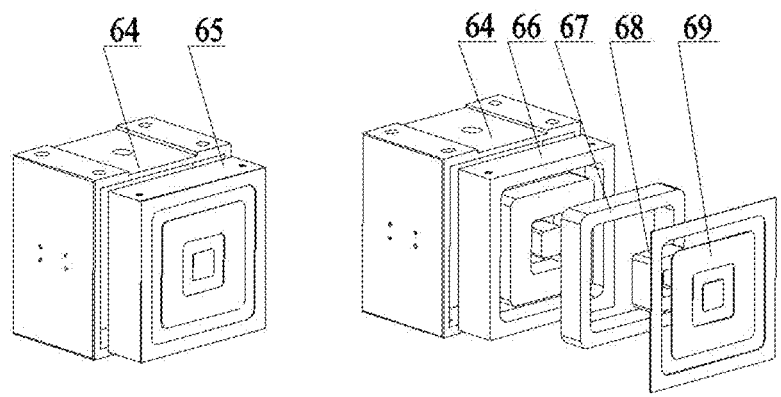
FIG. 7 is a schematic structural diagram of a middle left DIESOLE type electromagnet.
Figure 8:
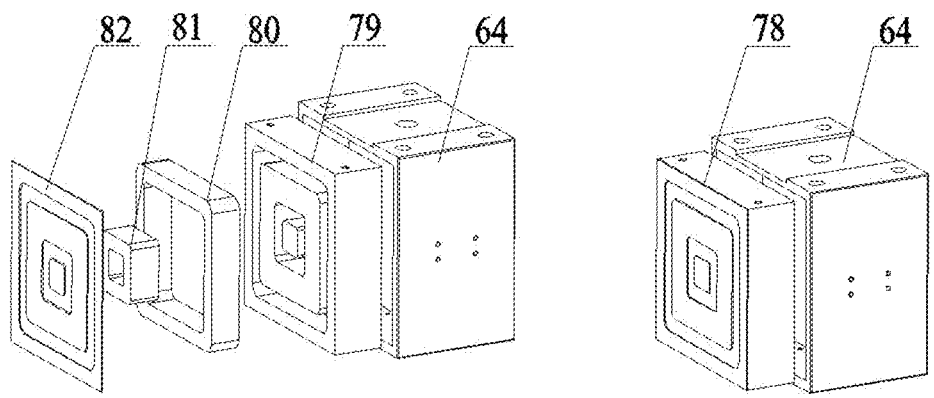
FIG. 8 is a schematic structural diagram of a middle right DIESOLE type electromagnet.

As shown in FIG. 5 and FIG. 6, the middle electromagnet assembly 5 is composed of a middle shaft fixing sleeve 53, a middle guide shaft 54, a middle linear bearing 55, a middle front lever support seat 56, a middle front long lever support 57, a middle front short lever support 58, a middle front long lever 59, a middle front short lever 60, a middle front lever connecting seat 61, a middle front straight rod 62, a middle front straight rod footstock 63, a magnetic isolation block 64, a middle left DIESOLE type electromagnet 65 (including a middle left electromagnet core 66, a middle left inner coil 67, a middle left outer coil 68 and a middle left magnetorheological elastomer 69, wherein the middle left inner coil 67 and the middle left outer coil 68 are respectively disposed in the corresponding positions in the middle left electromagnet core 66, and the middle left magnetorheological elastomer 69 is pasted on the surface of the middle left electromagnet core 66, as shown in FIG. 7), a middle rear lever support seat 70, a middle rear long lever support 71, a middle rear short lever support 72, a middle rear long lever 73, a middle rear short lever 74, a middle rear lever connecting seat 75, a middle rear straight rod 76, a middle rear straight rod footstock 77, and a middle right DIESOLE type electromagnet 78 (including a middle right electromagnet core 79, a middle right inner coil 80, a middle right outer coil 81 and a middle right magnetorheological elastomer 82, wherein the middle right inner coil 80 and the middle right outer coil 81 are respectively disposed in the corresponding positions in the middle right electromagnet core 79, and the middle right magnetorheological elastomer 82 is pasted on the surface of the middle right electromagnet core 79, as shown in FIG. 8). The middle left DIESOLE type electromagnet 65 and the middle right DIESOLE type electromagnet 78 are respectively installed on the left and right sides of the magnetic isolation block 64; the middle guide shaft 54 is installed in the middle shaft fixing sleeve 53; the middle shaft fixing sleeve 53 is installed on the base 1; and the middle linear bearing 55 is installed under the magnetic isolation block 64 and is matched with the middle guide shaft 54. The middle front straight rod footstock 63 and the middle rear straight rod footstock 77 are connected to the front and rear sides of the middle part under the support plate 10; one ends of the middle front straight rod 62 and the middle rear straight rod 76 are respectively connected with the middle front straight rod footstock 63 and the middle rear straight rod footstock 77; the other ends of the middle front straight rod 62 and the middle rear straight rod 76 are respectively connected with one ends of the middle front short lever 60 and the middle rear short lever 74; the other ends of the middle front short lever 60 and the middle rear short lever 74 are respectively connected with one ends of the middle front long lever 59 and the middle rear long lever 74; the other ends of the middle front long lever 59 and the middle rear long lever 73 are respectively connected with the middle front lever connecting seat 61 and the middle rear lever connecting seat 75; the middle front lever connecting seat 61 and the middle rear lever connecting seat 75 are fixedly installed on the front and rear sides of the magnetic isolation block 64 respectively; the middle front short lever support 58, the middle front long lever support 57, the middle rear short lever support 72 and the middle rear long lever support 71 are respectively installed in the corresponding positions of the middle front short lever 60, the middle front long lever 59, the middle rear short lever 74 and the middle rear long lever 73; and the middle front lever support seat 56 and the middle rear lever support seat 70 are respectively installed under the middle front short lever support 58, the middle front long lever support 57, the middle rear short lever support 72 and the middle rear long lever support 71 to play a support role.

Figure 9:
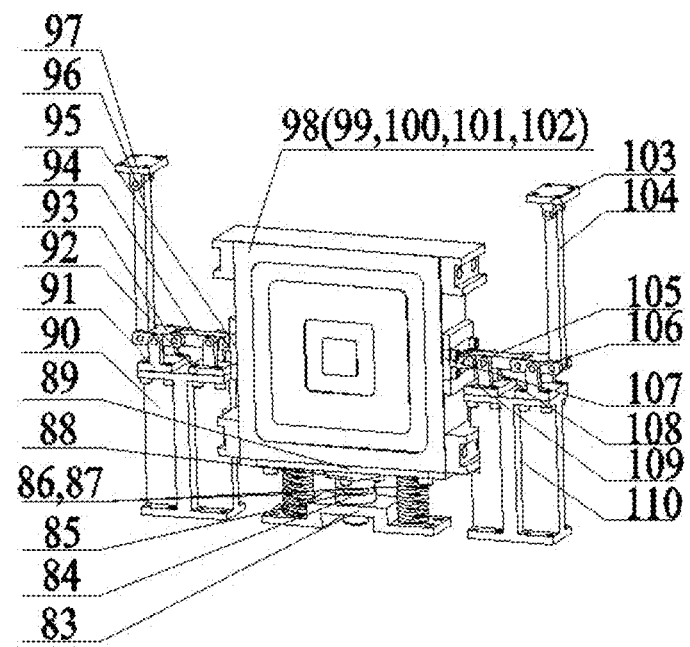
FIG. 9 is a schematic structural diagram of a right electromagnet assembly.
Figure 10:
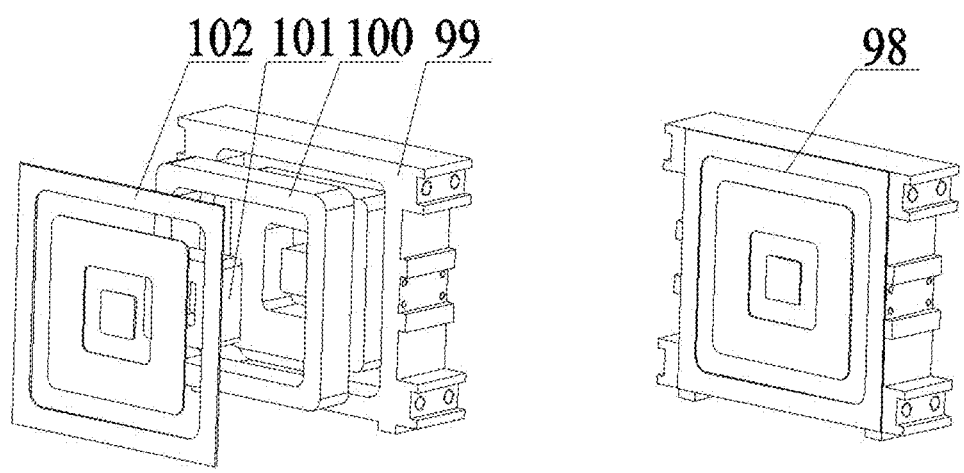
FIG. 10 is a schematic structural diagram of a right DIESOLE type electromagnet.

As shown in FIG. 9, the right electromagnet assembly 6 is composed of a right electromagnet fixing seat 83, a right shaft fixing sleeve 84, a right guide shaft 85, two right electromagnet support springs 86/87, a right linear bearing 88, a right electromagnet adjusting seat 89, a right front lever support seat 90, a right front short lever support 91, a right front long lever support 92, a right front short lever 93, a right front long lever 94, a right front lever connecting seat 95, a right front straight rod 96, a right front straight rod footstock 97, a right DIESOLE type electromagnet 98 (including a right electromagnet core 99, a right electromagnet outer coil 100, a right electromagnet inner coil 101 and a right magnetorheological elastomer 102, wherein the right electromagnet outer coil 100, the right electromagnet inner coil 101 and the right magnetorheological elastomer 102 are disposed in the corresponding positions in the right electromagnet core 99, and the right magnetorheological elastomer 102 is pasted on the surface of the right electromagnet core 99, as shown in FIG. 10), a right rear straight rod footstock 103, a right rear straight rod 104, a right rear long lever 105, a right rear short lever 106, a right rear lever connecting seat 107, a right rear short lever support 108, a right rear long lever support 109, and a right rear lever support seat 110. The right electromagnet fixing seat 83 is installed on the base 1; the right shaft fixing sleeve 84 is installed on the right electromagnet fixing seat 83; the right guide shaft 85 is installed in the right shaft fixing sleeve 84; the right electromagnet adjusting seat 89 is installed under the right DIESOLE type electromagnet 98; the right linear bearing 88 is installed on the right electromagnet adjusting seat 89 and is matched with the right guide shaft 85; and the two right electromagnet support springs 86/87 are installed between the right electromagnet fixing seat 83 and the right electromagnet adjusting seat 89 and are symmetrical about the right guide shaft 85. The right front straight rod footstock 97 and the right rear straight rod footstock 103 are respectively installed at the front and rear of the right side under the support plate 10; one ends of the right front straight rod 96 and the right rear straight rod 104 are respectively connected with the right front straight rod footstock 97 and the right rear straight rod footstock 103; the other ends of the right front straight rod 96 and the right rear straight rod 104 are respectively connected with one ends of the right front short lever 93 and the right rear short lever 106; the other ends of the right front short lever 93 and the right rear short lever 106 are respectively connected with one ends of the right front long lever 94 and the right rear long lever 105; the other ends of the right front long lever 94 and the right rear long lever 105 are respectively connected with the right front lever connecting seat 95 and the right rear lever connecting seat 107; the right front lever connecting seat 95 and the right rear lever connecting seat 107 are fixedly installed on the front and rear sides of the right DIESOLE type electromagnet 98 respectively; the right front short lever support 91, the right front long lever support 92, the right rear short lever support 108 and the right rear long lever support 109 are installed in the corresponding positions of the right front short lever 93, the right front long lever 94, the right rear short lever 106 and the right rear long lever 105; and the right front lever support seat 90 and the right rear lever support seat 110 are respectively installed under the right front short lever support 91, the right front long lever support 92, the right rear short lever support 108 and the right rear long lever support 109 to play a support role.

Figure 11:
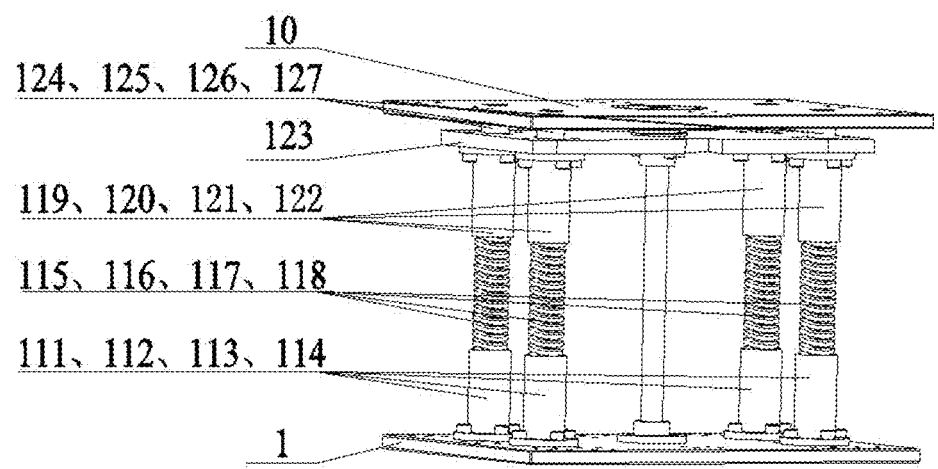
FIG. 11 is a schematic structural diagram when a spring assembly is fixed to a support plate.
Figure 12:
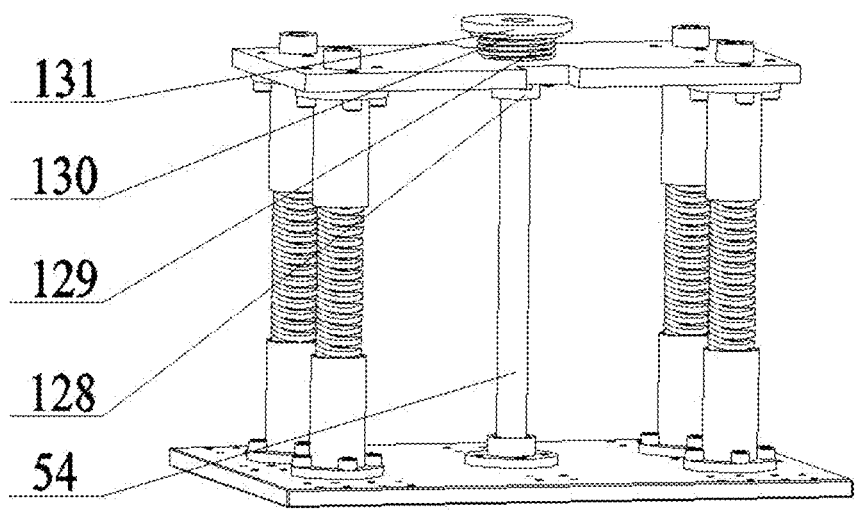
FIG. 12 is a schematic structural diagram when a spring assembly is not fixed to a support plate.

As shown in FIG. 11 and FIG. 12, the spring assembly 9 includes four spring lower locating sleeves 111/112/113/114, four bearing springs 115/116/117/118, four spring upper locating sleeves 119/120/121/122, a middle-layer plate 123, four support columns 124/125/126/127, a middle-layer plate linear bearing 128, a finely-adjusted spring 129, a finely-adjusted spring pressure plate 130 and a finely-adjusted nut 131. The four spring lower locating sleeves 111/112/113/114 are symmetrically installed at the periphery above the bottom plate 1 respectively; the four spring upper locating sleeves 119/120/121/122 are symmetrically installed at the periphery under the middle-layer plate 123 respectively and correspond to the four spring lower locating sleeves 111/112/113/114; the four bearing springs 115/116/117/118 are respectively disposed between the corresponding four spring lower locating sleeves 111/112/113/114 and four spring upper locating sleeves 119/120/121/122; the four support columns 124/125/126/127 are respectively installed at the periphery above the middle-layer plate 123; the middle-layer plate linear bearing 128 is installed under the middle-layer plate 123 and is matched with the middle guide shaft 54; the finely-adjusted spring 131 is disposed on a middle locating column of the middle-layer plate 123; the spring pressure plate 130 is disposed above the finely-adjusted spring 129; the finely-adjusted nut 131 is disposed above the spring pressure plate 130 and is in threaded fit with the middle guide shaft 54; and when the overall height of a system is adjusted, an internal hexagonal hole at the upper part of the finely-adjusted nut 131 is rotated by a wrench.

The bottom plate 1, the middle-layer plate 123 and the magnetic isolation block 64 are all made of magnetic isolation materials. The left electromagnet core 41, the right electromagnet core 99, the left armature 14, the right armature 21, the middle left electromagnet core 66 and the middle right electromagnet core 79 are all made of high-permeability materials.

Figure 13:
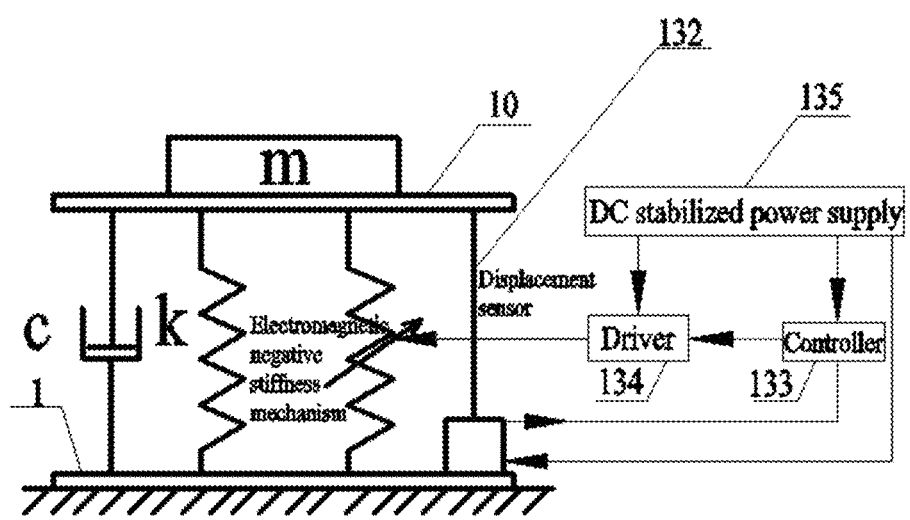
FIG. 13 is a systematic overall relationship diagram of a magnetic suspension type quasi-zero stiffness electromagnetic vibration isolator with active negative stiffness.

As shown in FIG. 13, the bottom plate 1 is installed on a foundation, and the displacement sensor 132 is installed between the support plate 10 and the bottom plate 1. During working, the DC stabilized power supply 135 provides power for the displacement sensor 132, the controller 133 and the driver 134 respectively. When the load acting on the support plate 10 vibrates, the displacement sensor 132 transmits the detected system displacement data to the controller 133; the controller 133 sends a related instruction to the driver 134 according to the established control law; and after the driver 134 amplifies a signal according to the instruction, the working current is input into the left DIESOLE type electromagnet 40 or the right DIESOLE type electromagnet 98 to drive the electromagnet to attract the left armature 14 and the right armature 21 to form a complete magnetic circuit, thereby realizing active linear electromagnetic negative stiffness. When the controller 133 does not work, passive electromagnetic negative stiffness is realized.

Figure 14:
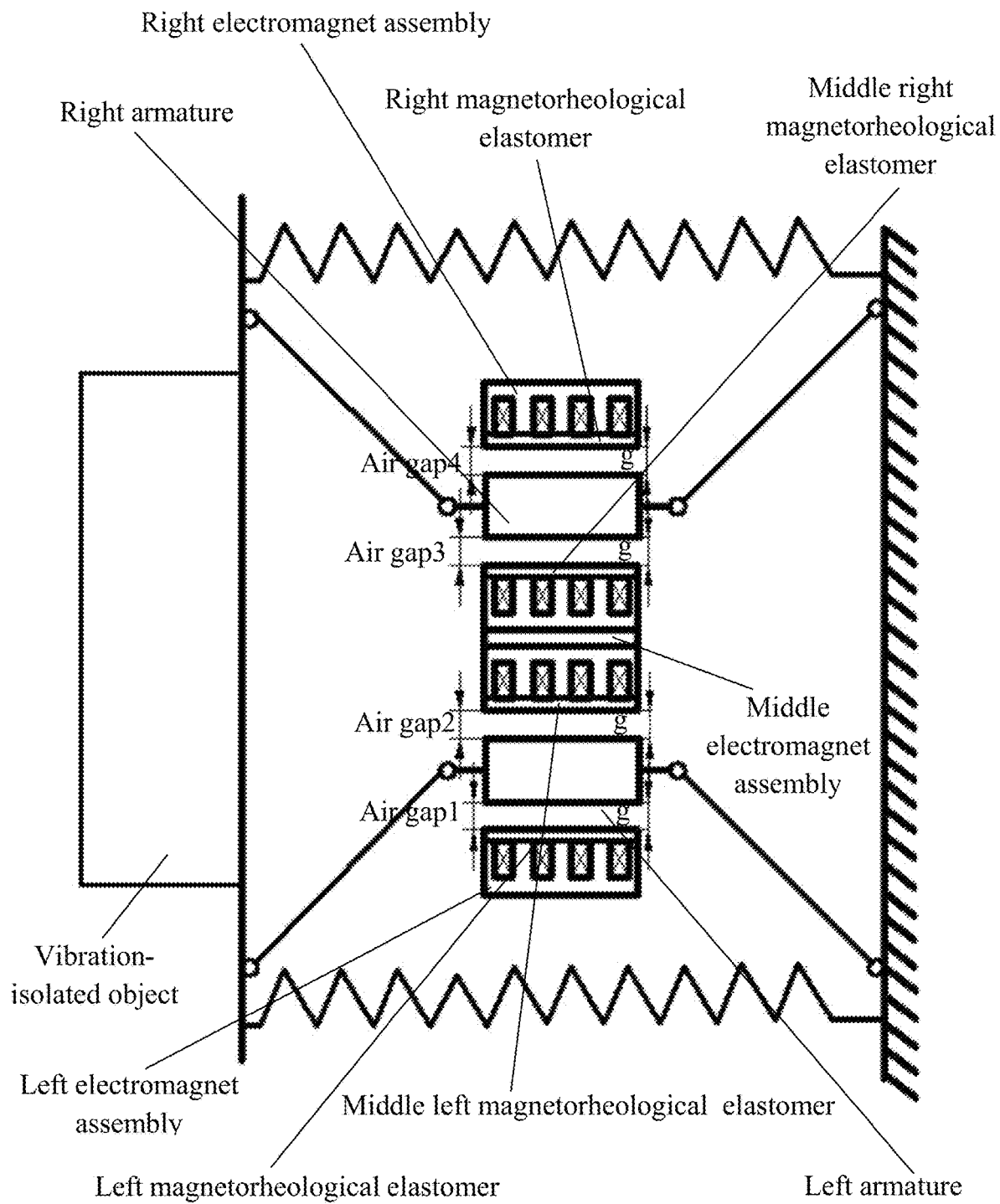
FIG. 14 is a structural diagram of a magnetic suspension type quasi-zero stiffness electromagnetic vibration isolator with active negative stiffness in a static balance position.

As shown in FIG. 14, after a vibration-isolated object is disposed on the support plate 10, when no excitation is generated, the finely-adjusted nut 131 is adjusted to enable an air gap 1 between the left DIESOLE type electromagnet 40 and the left armature 14, an air gap 2 between the left armature 14 and the middle left DIESOLE type electromagnet 65, an air gap 3 between the middle right DIESOLE type electromagnet 78 and the right armature 21, and an air gap 4 between the right armature 21 and the right DIESOLE type electromagnet 98 to be equal to g; no current is input into the outer coil 24 and inner coil 43 of the left DIESOLE type electromagnet 40 and the outer coil 100 and inner coil 101 of the right DIESOLE type electromagnet 98; the electromagnetic negative stiffness mechanism does not work; and only four bearing springs 111/112/113/114 provide static load force.

Figure 15:
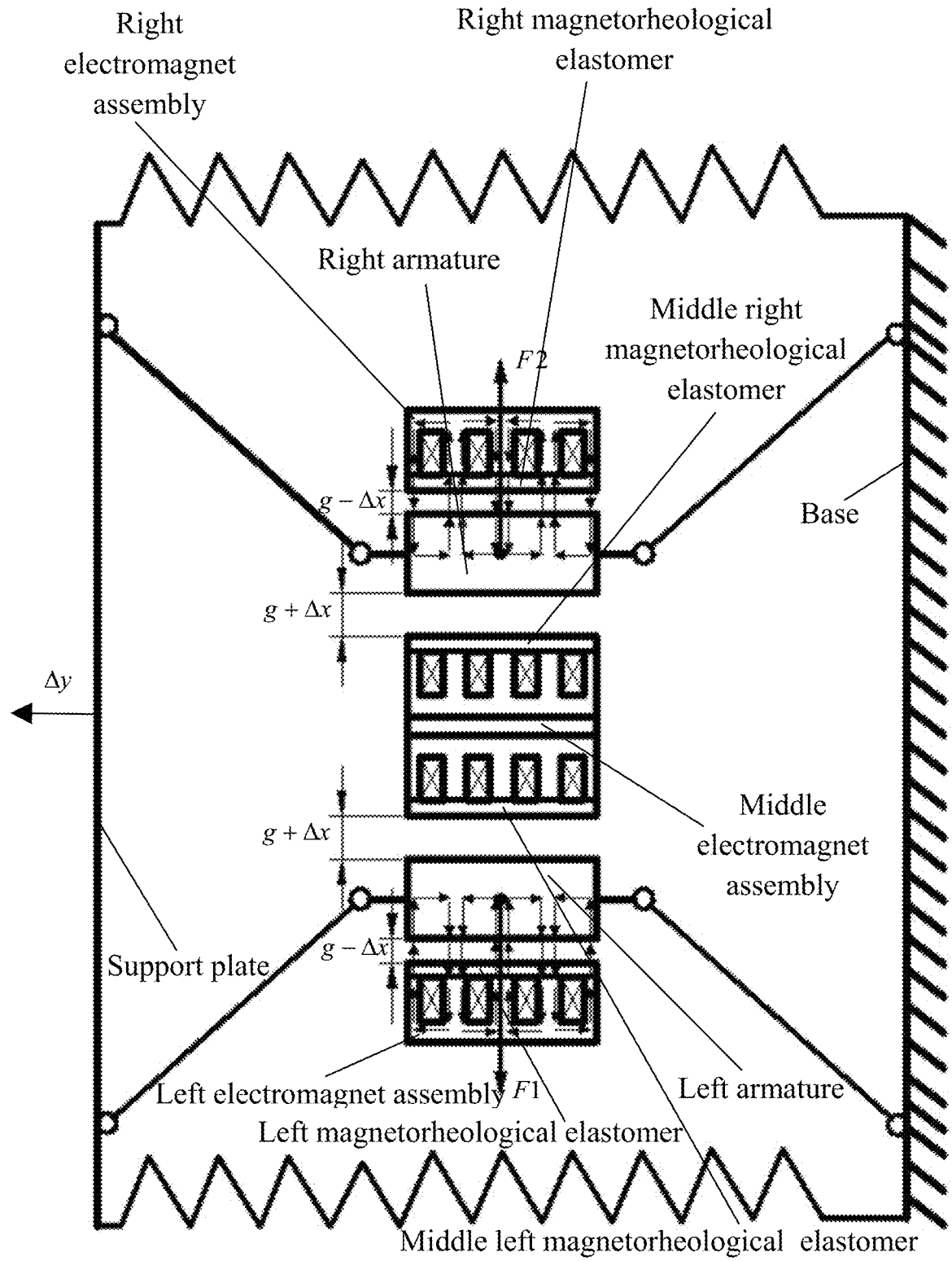
FIG. 15 is a structural diagram of a magnetic circuit and electromagnetic force conditions when a magnetic suspension type quasi-zero stiffness electromagnetic vibration isolator with active negative stiffness is in a working state and is subjected to upward excitation.

As shown in FIG. 15, after the vibration-isolated object is disposed on the support plate 10, when upward excitation is generated, the controller 133 and the displacement sensor 132 work; the upward displacement of the support plate 10 is Δy; the leftward displacement of the left armature 14 is $$\frac{\Delta x}{2};$$

the rightward displacement of the right armature 21 is $$\frac{\Delta x}{2};$$

when the displacement information is detected by the displacement sensor 132, the controller 133 controls the driver 134 to simultaneously input the same magnitude of current into the left electromagnet outer ring 42, the left electromagnet inner coil 43, the right electromagnet outer coil 100 and the right electromagnet inner coil 101; a complete magnetic circuit is formed between the left DIESOLE type electromagnet 40 and the left armature 14 and an air gap between the left DIESOLE type electromagnet and the left armature is $$g - \frac{\Delta x}{2}$$

(wherein the left magnetorheological elastomer 44 not only plays a magnetic conduction role, but also prevents the left electromagnet core 41 and the left armature 14 from directly colliding with each other to play a buffer protection role); a complete magnetic circuit is formed between the right DIESOLE type electromagnet 98 and the right armature 21 and an air gap between the right DIESOLE type electromagnet and the right armature is $$g - \frac{\Delta x}{2}$$

wherein the right magnetorheological elastomer 102 not only plays a magnetic conduction role, but also prevents the right electromagnet core 99 and the right armature 21 from directly colliding with each other to play a buffer protection role); the direction of the electromagnetic force F received by the left armature 14 is leftward; the direction of the electromagnetic force $F_2$ received by the right armature 21 is rightward; and the electromagnetic force F and the electromagnetic force $F_2$ have the same magnitude, so that the upward movement trend of the vibration-isolated object is accelerated, and active negative stiffness properties are realized.

Figure 16:
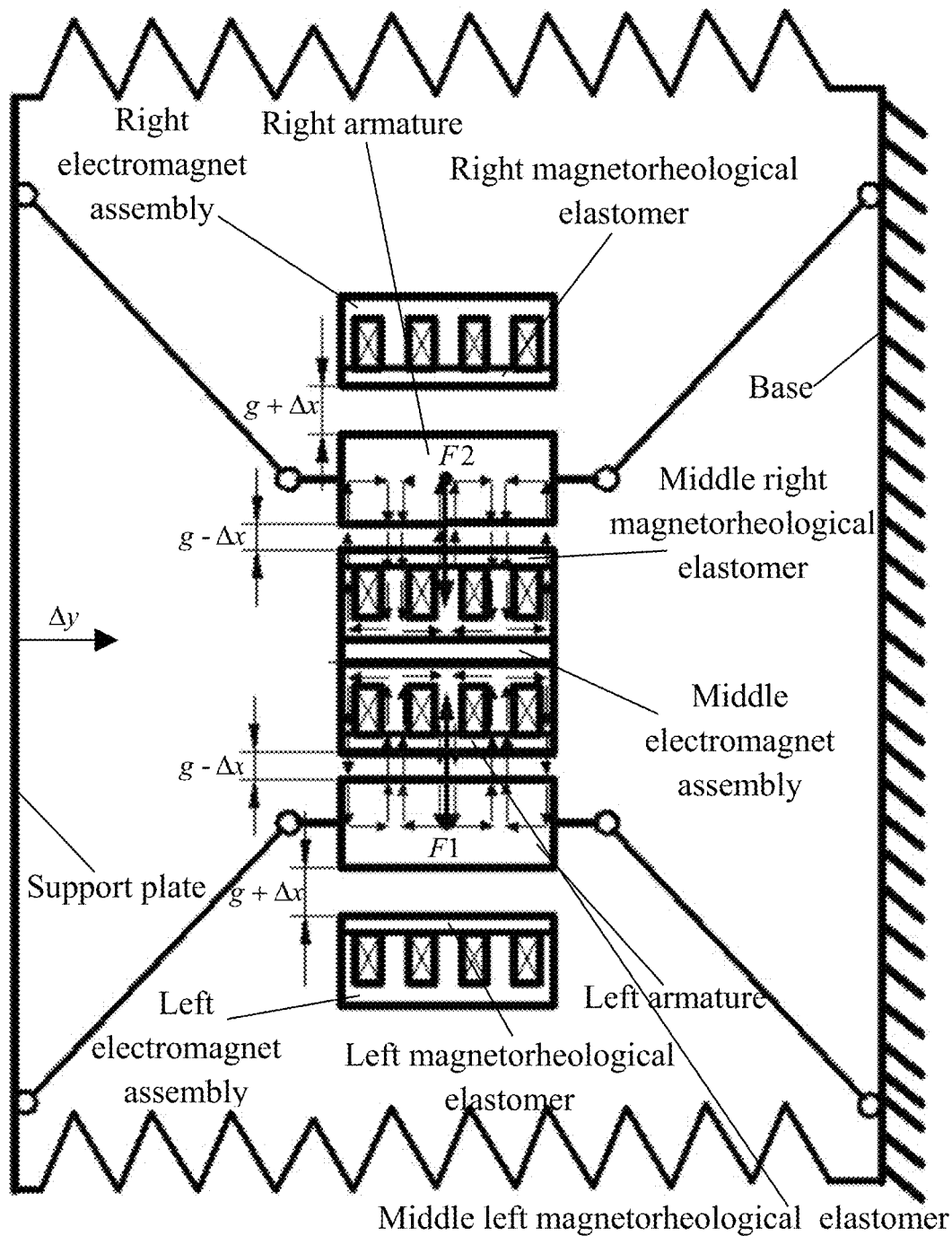
FIG. 16 is a structural diagram of a magnetic circuit and electromagnetic force conditions when a magnetic suspension type quasi-zero stiffness electromagnetic vibration isolator with active negative stiffness is in a working state and is subjected to downward excitation.

As shown in FIG. 16, after the vibration-isolated object is disposed on the support plate, when downward excitation is generated, the controller 133 and the displacement sensor 132 work; the downward displacement of the support plate 10 is Δy; the rightward displacement of the left armature 14 is $$\frac{\Delta x}{2};$$

the leftward displacement of the right armature 21 is $$\frac{\Delta r}{2};$$

when the displacement information is detected by the displacement sensor 132, the controller 133 controls the driver 134 to simultaneously input the same magnitude of current into the middle left inner coil 67, the middle left outer coil 68, the middle right inner coil 80 and the middle right outer coil 81; a complete magnetic circuit is formed between the middle left DIESOLE type electromagnet 65 and the left armature 14 and an air gap between the middle left DIESOLE type electromagnet and the left armature is $$g - \frac{\Delta x}{2}$$

(wherein the middle left magnetorheological elastomer 69 not only plays a magnetic conduction role, but also prevents the middle left electromagnet core 66 and the left armature 14 from directly colliding with each other to play a buffer protection role); a complete magnetic circuit is formed between the middle right DIESOLE type electromagnet 78 and the right armature 21 and an air gap between the middle right DIESOLE type electromagnet and the right armature is $$g - \frac{\Delta x}{2}$$

(wherein the middle right magnetorheological elastomer 82 not only plays a magnetic conduction role, but also prevents the middle right electromagnet core 66 and the right armature 21 from directly colliding with each other to play a buffer protection role); the direction of the electromagnetic force $F_1$ received by the left armature 14 is rightward; the direction of the electromagnetic force $F_2$ received by the right armature 21 is leftward; and the electromagnetic force $F_1$ and the electromagnetic force $F_2$ have the same magnitude, so that the downward movement trend of the vibration-isolated object is accelerated, and active negative stiffness properties are realized.

Figure 17:
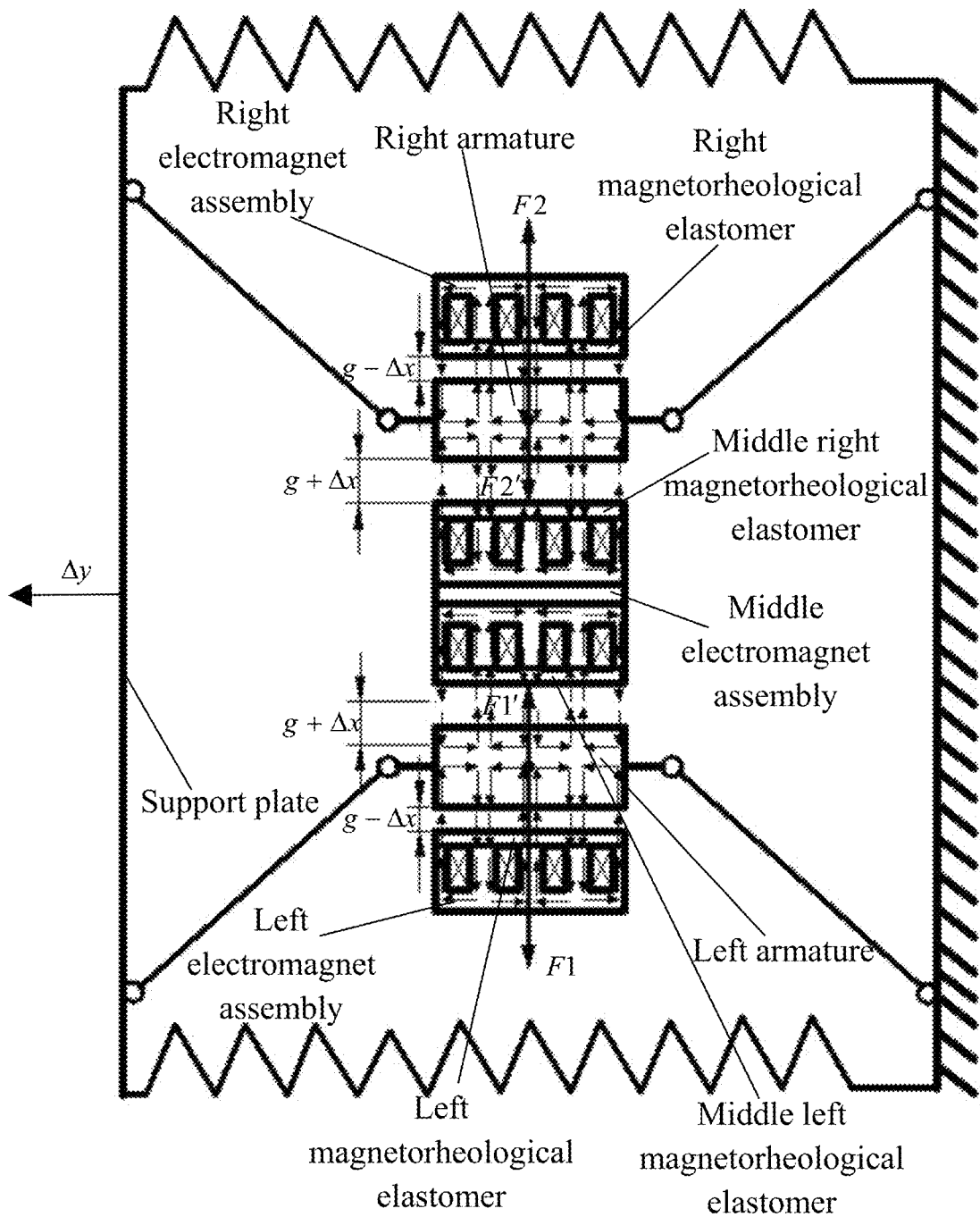
FIG. 17 is a structural diagram of a magnetic circuit and electromagnetic force conditions when a controller and a displacement sensor do not work and a vibration isolator is in a working state and is subjected to upward excitation. At this time, passive negative stiffness is realized.

As shown in FIG. 17, after the vibration-isolated object is disposed on the support plate 10, when upward excitation is generated, the controller 133 and the displacement sensor 132 do not work; the upward displacement of the support plate 10 is Δy; the leftward displacement of the left armature 14 is $$\frac{\Delta x}{2};$$

the rightward displacement of the right armature is $$\frac{\Delta x}{2};$$

the driver simultaneously inputs the same magnitude of current into the left electromagnet outer ring 42, the left electromagnet inner coil 43, the right electromagnet outer coil 100, the right electromagnet inner coil 101, the middle left inner coil 67, the middle left outer coil 68, the middle right inner coil 80 and the middle right outer coil 81; a complete magnetic circuit is formed between the left DIESOLE type electromagnet 40 and the left armature 14 and an air gap between the left DIESOLE type electromagnet and the left armature is $$g - \frac{\Delta x}{2};$$

a complete magnetic circuit is formed between the middle left DIESOLE type electromagnet 65 and the left armature 14 and an air gap between the middle left DIESOLE type electromagnet and the left armature is $$g+\frac{\Delta x}{2};$$

a complete magnetic circuit is formed between the middle right DIESOLE type electromagnet 78 and the right armature 21 and an air gap between the middle right DIESOLE type electromagnet and the right armature is $$g+\frac{\Delta x}{2};$$

a complete magnetic circuit is formed between the right DIESOLE type electromagnet 98 and the right armature 21 and an air gap between the right DIESOLE type electromagnet and the right armature is $$g-\frac{\Delta x}{2};$$

the direction of the electromagnetic force $F_1$–$F_1'$ received by the left armature 14 is leftward; the direction of the electromagnetic force $F_2$–$F_2'$ received by the right armature 21 is rightward; and the electromagnetic force $F_1$–$F_1'$ and the electromagnetic force $F_2$–$F_2'$ have the same magnitude, so that the upward movement trend of the vibration-isolated object is accelerated, and passive negative stiffness properties are realized.

Figure 18:
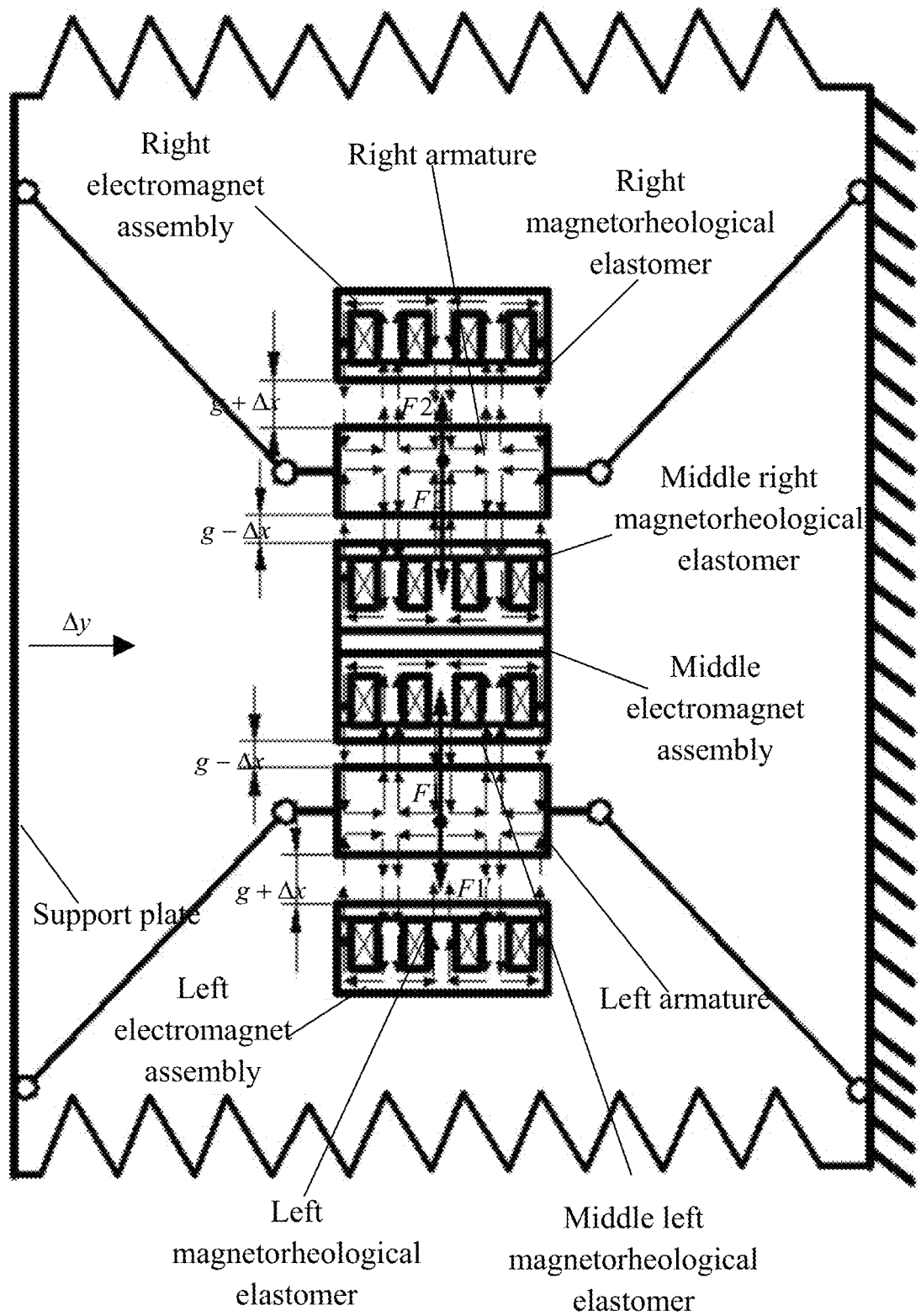
FIG. 18 is a structural diagram of a magnetic circuit and electromagnetic force conditions when a controller and a displacement sensor do not work and a vibration isolator is in a working state and is subjected to downward excitation. At this time, passive negative stiffness is realized.

As shown in FIG. 18, after the vibration-isolated object is disposed on the support plate 10, when downward excitation is generated, the controller 133 and the displacement sensor 132 do not work; the downward displacement of the support plate 10 is Δy; the rightward displacement of the left armature 14 is $$\frac{\Delta x}{2};$$

the leftward displacement of the right armature is $$\frac{\Delta x}{2};$$

the driver simultaneously inputs the same magnitude of current into the left electromagnet outer coil 42, the left electromagnet inner coil 43, the right electromagnet outer coil 100, the right electromagnet inner coil 101, the middle left inner coil 67, the middle left outer coil 68, the middle right inner coil 80 and the middle right outer coil 81; a complete magnetic circuit is formed between the left DIESOLE type electromagnet 40 and the left armature 14 and an air gap between the left DIESOLE type electromagnet and the left armature is $$g+\frac{\Delta x}{2};$$

a complete magnetic circuit is formed between the middle left DIESOLE type electromagnet 65 and the left armature 14 and an air gap between the middle left DIESOLE type electromagnet and the left armature is $$g-\frac{\Delta x}{2};$$

a complete magnetic circuit is formed between the middle right DIESOLE type electromagnet 78 and the right armature 21 and an air gap between the middle right DIESOLE type electromagnet and the right armature is $$g-\frac{\Delta x}{2};$$

a complete magnetic circuit is formed between the right DIESOLE type electromagnet 98 and the right armature 21 and an air gap between the right DIESOLE type electromagnet and the right armature is $$g+\frac{\Delta x}{2};$$

the direction of the electromagnetic force $F_1$–$F_1'$ received by the left armature 14 is rightward; the direction of the electromagnetic force $F_2$–$F_2$ received by the right armature 21 is leftward; and the electromagnetic force $F_1$–$F_1'$ and the electromagnetic force $F_2$–$F_2'$ have the same magnitude, so that the downward movement trend of the vibration-isolated object is accelerated, and passive negative stiffness properties are realized.

Figure 19:
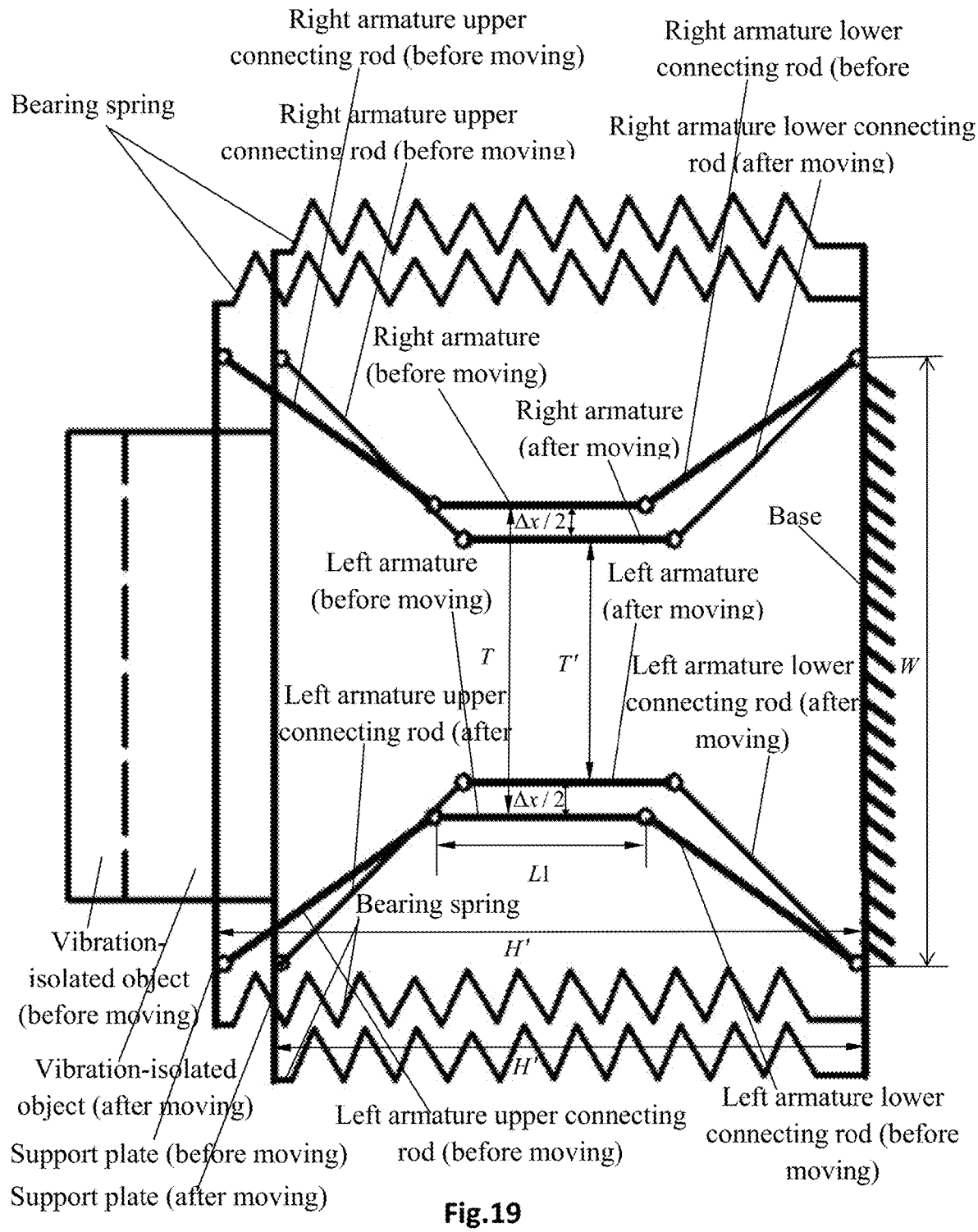
FIG. 19 is a schematic diagram of structure size changes before and after displacement of a rotor assembly.

As shown in FIG. 19, before and after the displacement of the rotor assembly 2, the displacement change of the support plate 10 in the vertical direction is Δy; the displacement change of the left armature 14 and the right armature 21 in the horizontal direction is respectively $$\frac{\Delta x}{2};$$

the change in the distance between the left armature 14 and the right armature 21 is Δx; and the relationship between the left armature and the right armature can be determined according to Formulas (1), (2) and $$\left(\frac{W-T}{2}\right)^2+\left(\frac{H-L_1}{2}\right)^2=\left(\frac{W-T'}{2}\right)^2+\left(\frac{H'-L_1}{2}\right)^2, \quad (1)$$

$$T=T'\Delta x, H=H\ +\Delta y, \quad (2)$$

$$W=(H-L)\frac{\Delta y}{\Delta x}+T-\frac{\Delta x}{2}-\frac{\Delta y^2}{2\Delta x},. \quad (3)$$

In the formulas, W denotes the distance between center holes of the left armature lower connecting rod base and the right armature lower connecting rod base; T denotes the distance between the left armature and the right armature before a dynamic load is applied; T' denotes the distance between the left armature and the right armature after a dynamic load is applied; $L_1$ denotes the length of the left armature and the right armature; H denotes the height between the support plate and the base before a dynamic load is applied; H' denotes the height between the support plate and the base after a dynamic load is applied; Δx denotes the magnitude of displacement between rods A and B before and after a dynamic load is applied; and Δy denotes the magnitude of displacement change of the support plate in the vertical direction before and after a load is applied.

$$F_m \propto \frac{I^2}{\left(g - \frac{\Delta x}{2}\right)^2}, \quad (4)$$

In the formulas, $F_m$ denotes the magnitude of electromagnetic force between an electromagnet and an armature; g denotes the magnitude of an air gap between the left DIESOLE type electromagnet and the left armature in a static balance position (equal to the magnitude of an air gap between the right DIESOLE type electromagnet and the right armature); and I denotes the magnitude of input current.

It can be seen from Formula (4) that the magnitude of the electromagnetic force between the electromagnet and the armature is inversely proportional to the magnitude of the air gap, and the ratio of $\Delta x$ to $\Delta y$ can be adjusted by setting related structural parameters. If $$k = \frac{\Delta x}{2\Delta y},$$

when k>1, the rotor assembly 2 is a displacement amplifying device, so that the air gap between the left DIESOLE type electromagnet 40 and the left armature 14 or the air gap between the right DIESOLE type electromagnet 98 and the right armature 21 is greatly reduced, and the magnitude of the electromagnetic force and electromagnetic negative stiffness is increased. Furthermore, the controller 133 can adjust the input current at any time according to related control strategies, so as to ensure good linearity while ensuring larger electromagnetic negative stiffness, thereby avoiding complex dynamic behaviors such as jumping during working of the system.

Figure 20:
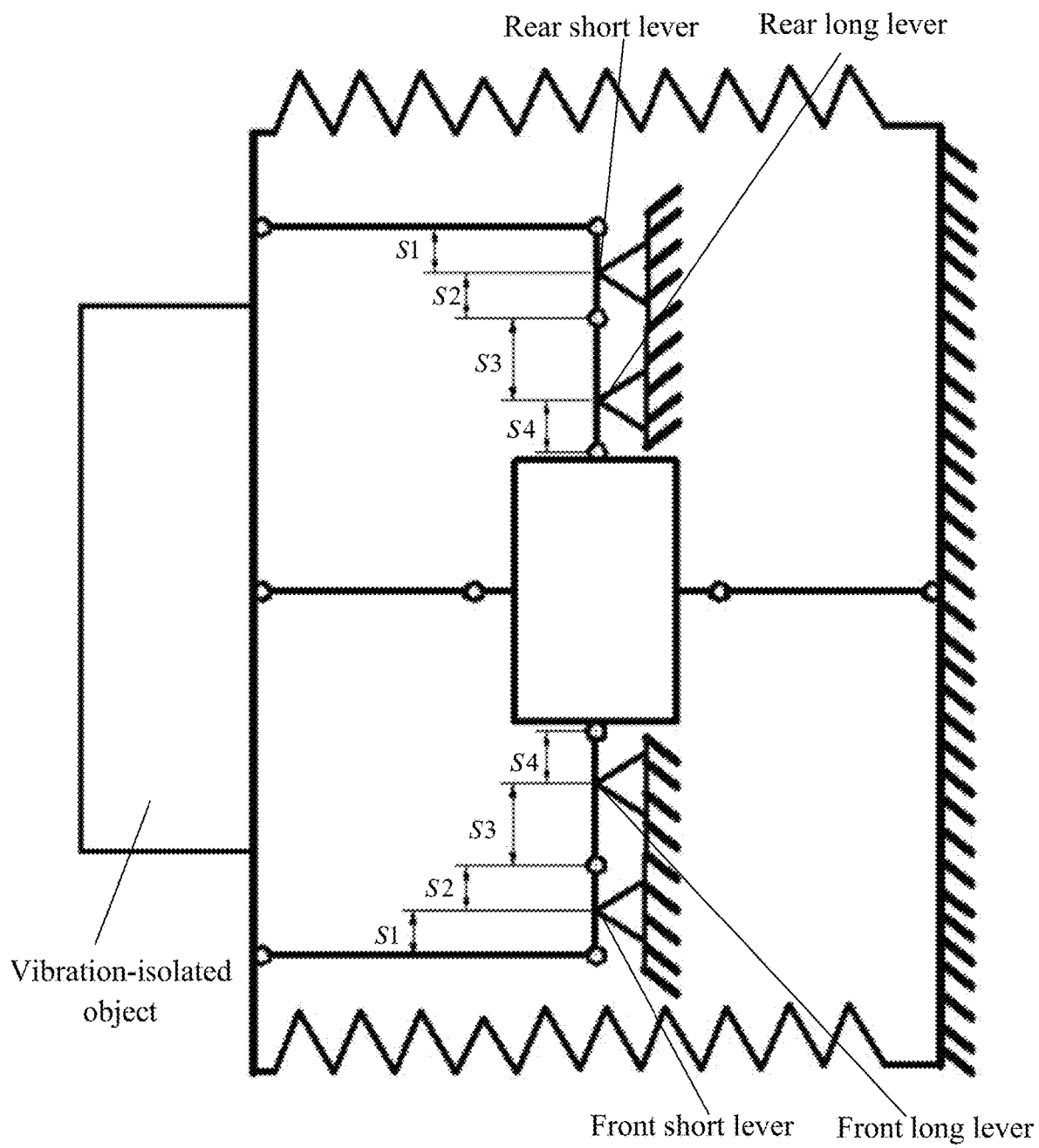
FIG. 20 is a left-view structural diagram of a magnetic suspension type quasi-zero stiffness electromagnetic vibration isolator with active negative stiffness.

FIG. 20 is a left-view schematic diagram of a system. In order to ensure that the position of the stator assembly 3 (the left electromagnet assembly 4, the middle electromagnet assembly 5 and the right electromagnet assembly 6) in the vertical direction is consistent with the position of the rotor assembly 2, the positions of fulcrums of related short levers (the left front short lever 35, the left rear short lever 48, the middle front short lever 60, the middle rear short lever 74, the right front short lever 93 and the right rear short lever 106) and long levers (the left front long lever 36, the left rear long lever 47, the middle front long lever 59, the middle rear long lever 73, the right front long lever 94 and the right rear long lever 105) need to be set, in the figure, $$\frac{S1}{S2} = 1, \frac{S3}{S4} = 2.$$

Figure 21:
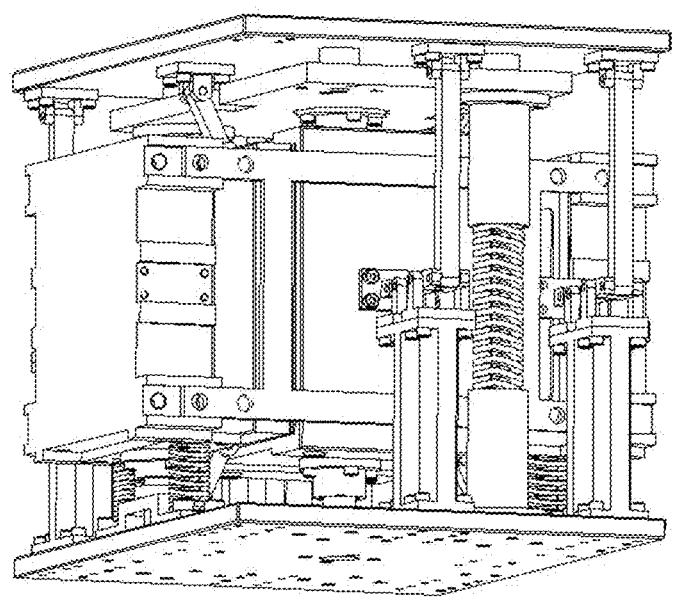
FIG. 21 is a schematic structural diagram of a magnetic suspension type quasi-zero stiffness electromagnetic vibration isolator with active negative stiffness after the related fixed relationship is released.

As shown in FIG. 21, before and after the vibration-isolated object is disposed on the support plate 10, if the vibration-isolated object is too heavy, the compression of the bearing springs 115/116/117/118, the overall height of the system and the position of the rotor assembly 2 are greatly changed, and then, the finely-adjusted spring 131 is difficult to adjust. The fixed relationships among the left electromagnet adjusting seat 31, the left electromagnet front lever connecting seat 37, the left electromagnet rear lever connecting seat 49, the front connecting plate 7, the rear connecting plate 8 and the left DIESOLE type electromagnet 40 are released first; the fixed relationships among the right electromagnet adjusting seat 89, the right electromagnet front lever connecting seat 95, the right electromagnet rear lever connecting seat 107, the front connecting plate 7, the rear connecting plate 8 and the right DIESOLE type electromagnet 98 are released; the positions of the left electromagnet adjusting seat 31, the left electromagnet front lever connecting seat 37, the left electromagnet rear lever connecting seat 49, the front connecting plate 7 and the rear connecting plate 8 in related grooves of the left DIESOLE type electromagnet 40 are adjusted; the positions of the right electromagnet adjusting seat 89, the right electromagnet front lever connecting seat 95, the right electromagnet rear lever connecting seat 107, the front connecting plate 7 and the rear connecting plate 8 in related grooves of the right DIESOLE type electromagnet 98 are adjusted; and after the vibration-isolated object is loaded, the related fixed relationships are restored.

If the mass of the vibration-isolated object is different, since the static load compression of the bearing springs 115/116/117/118 and the related position of the rotor assembly 2 are different, when the system is in a static balance position after the vibration-isolated object is loaded, the magnitudes of the air gap 1, the air gap 2, the air gap 3 and the air gap 4 are inevitably different. Since the disclosure can control the magnitude of the current input into the system by the driver 134 through the controller 133 in real time, under the condition that initial air gaps are different, the current can be changed to make the magnetic force be constant and maintain good linearity under the condition of different displacements. Thus, the linear negative stiffness remains unchanged and can be well balanced with the positive stiffness.

The above are only the preferred examples of the magnetic suspension type quasi-zero stiffness electromagnetic vibration isolator with active negative stiffness; the protection scope of the magnetic suspension type quasi-zero stiffness electromagnetic vibration isolator with active negative stiffness is not limited to the above examples, and all technical solutions under this idea belong to the protection scope of the disclosure. It should be noted that those skilled in the art can make several improvements and changes without departing from the principle of the disclosure, and these improvements and changes should also be regarded as the protection scope of the disclosure.

What is claimed is:

1. A magnetic suspension type quasi-zero stiffness electromagnetic vibration isolator with active negative stiffness, comprising an actuator and an electric control part,
    wherein the actuator comprises a bottom plate, a rotor assembly, a stator assembly, a spring assembly and a support plate; the bottom plate supports the rotor assembly and the stator assembly; and the spring assembly connects the support plate and the stator assembly;
    the electric control part comprises a displacement sensor, a controller, a driver and a DC stabilized power supply; the displacement sensor is installed between the support plate and the bottom plate; and the DC stabilized power supply supplies power to the displacement sensor, the controller and the driver respectively;
    wherein the rotor assembly comprises a left armature lower connecting rod base, a left armature lower connecting rod, a left armature upper connecting rod seat, a left armature, a left armature lower connecting rod seat, a left armature upper connecting rod, a left armature upper connecting rod footstock, a right armature upper connecting rod footstock, a right armature upper connecting rod, a right armature upper connecting rod seat, a right armature, a right armature lower connecting rod seat, a right armature lower connecting rod and a right armature lower connecting rod base;

the left armature upper connecting rod footstock is installed on a left side under the support plate; the left armature lower connecting rod base is installed on a left side above the bottom plate; the left armature upper connecting rod seat and the left armature lower connecting rod seat are installed at middle parts of upper and lower ends of the left armature, respectively; one ends of the left armature upper connecting rod and the left armature lower connecting rod are connected with the left armature upper connecting rod seat and the left armature lower connecting rod seat, respectively; the other ends of the left armature upper connecting rod and the left armature lower connecting rod are connected with the left armature upper connecting rod footstock and the left armature lower connecting rod base, respectively; the right armature upper connecting rod footstock is installed on a right side under the support plate; the right armature lower connecting rod base is installed on a right side above the bottom plate; the right armature upper connecting rod seat and the right armature lower connecting rod seat are installed at middle parts of upper and lower ends of the right armature, respectively; one ends of the right armature upper connecting rod and the right armature lower connecting rod are connected with the right armature upper connecting rod seat and the right armature lower connecting rod seat, respectively; and the other ends of the right armature upper connecting rod and the right armature lower connecting rod are connected with the right armature upper connecting rod footstock and the right armature lower connecting rod base, respectively.

2. The magnetic suspension type quasi-zero stiffness electromagnetic vibration isolator according to claim 1, wherein the stator assembly comprises a left electromagnet assembly, a middle electromagnet assembly, a right electromagnet assembly, a front connecting plate and a rear connecting plate; and the left electromagnet assembly, the middle electromagnet assembly and the right electromagnet assembly are each installed between the base and the support plate; the left electromagnet assembly and the right electromagnet assembly are symmetrical about the middle electromagnet assembly; and the front connecting plate and the rear connecting plate are installed to connect the front and rear sides of the left electromagnet assembly and the right electromagnet assembly together, respectively.

3. The magnetic suspension type quasi-zero stiffness electromagnetic vibration isolator according to claim 2, wherein the left electromagnet assembly comprises a left electromagnet fixing seat, a left shaft fixing sleeve, a left guide shaft, two left electromagnet support springs, a left linear bearing, a left electromagnet adjusting seat, a left front lever support seat, a left front short lever support, a left front long lever support, a left front short lever, a left front long lever, a left front lever connecting seat, a left front straight rod, a left front straight rod footstock, a left DIESOLE type electromagnet, a left rear straight rod footstock, a left rear straight rod, a left rear long lever, a left rear short lever, a left rear lever connecting seat, a left rear short lever support, a left rear long lever support and a left rear lever support seat; and the left DIESOLE type electromagnet comprises a left electromagnet core, a left electromagnet outer coil, a left electromagnet inner coil and a left magnetorheological elastomer;

the left electromagnet fixing seat is installed on the base; the left shaft fixing sleeve is installed on the left electromagnet fixing seat; the left guide shaft is installed in the left shaft fixing sleeve; the left electromagnet adjusting seat is installed under the left DIESOLE type electromagnet; the left linear bearing is installed on the left electromagnet adjusting seat and is matched with the left guide shaft; and the two left electromagnet support springs are installed between the left electromagnet fixing seat and the left electromagnet adjusting seat and are symmetrical about the left guide shaft; and the left front straight rod footstock and the left rear straight rod footstock are installed at the front and rear of the left side under the support plate, respectively; one ends of the left front straight rod and the left rear straight rod are connected with the left front straight rod footstock and the left rear straight rod footstock, respectively; the other ends of the left front straight rod and the left rear straight rod are connected with one ends of the left front short lever and the left rear short lever, respectively; the other ends of the left front short lever and the left rear short lever are connected with one ends of the left front long lever and the left rear long lever, respectively; the other ends of the left front long lever and the left rear long lever are connected with the left front lever connecting seat and the left rear lever connecting seat, respectively; the left front lever connecting seat and the left rear lever connecting seat are fixedly installed on front and rear sides of the left DIESOLE type electromagnet, respectively; the left front short lever support, the left front long lever support, the left rear short lever support and the left rear long lever support are installed in corresponding positions of the left front short lever, the left front long lever, the left rear short lever and the left rear long lever; and the left front lever support seat and the left rear lever support seat are installed under the left front short lever support and the left front long lever support, and the left rear short lever support and the left rear long lever support, respectively, to play a support role.

4. The magnetic suspension type quasi-zero stiffness electromagnetic vibration isolator according to claim 3, wherein the middle electromagnet assembly comprises a middle shaft fixing sleeve, a middle guide shaft, a middle linear bearing, a middle front lever support seat, a middle front long lever support, a middle front short lever support, a middle front long lever, a middle front short lever, a middle front lever connecting seat, a middle front straight rod, a middle front straight rod footstock, a magnetic isolation block, a middle left DIESOLE type electromagnet, a middle rear lever support seat, a middle rear long lever support, a middle rear short lever support, a middle rear long lever, a middle rear short lever, a middle rear lever connecting seat, a middle rear straight rod, a middle rear straight rod footstock and a middle right DIESOLE type electromagnet;

the middle left DIESOLE type electromagnet comprises a middle left electromagnet core, a middle left inner coil, a middle left outer coil and a middle left magnetorheological elastomer; the middle right DIESOLE type electromagnet comprises a middle right electromagnet core, a middle right inner coil, a middle right outer coil and a middle right magnetorheological elastomer;

the middle left DIESOLE type electromagnet and the middle right DIESOLE type electromagnet are installed on left and right sides of the magnetic isolation block, respectively; the middle guide shaft is installed in the middle shaft fixing sleeve; the middle shaft fixing sleeve is installed on the bottom plate; the middle linear bearing is installed under the magnetic isolation block and is matched with the middle guide shaft; the middle front straight rod footstock and the middle rear straight rod footstock are connected to front and rear sides of a middle part under the support plate; one ends of the middle front straight rod and the middle rear straight rod are connected with the middle front straight rod footstock and the middle rear straight rod footstock, respectively; the other ends of the middle front straight rod and the middle rear straight rod are connected with one ends of the middle front short lever and the middle rear short lever, respectively; the other ends of the middle front short lever and the middle rear short lever are connected with one ends of the middle front long lever and the middle rear long lever, respectively; the other ends of the middle front long lever and the middle rear long lever are connected with the middle front lever connecting seat and the middle rear lever connecting seat, respectively; the middle front lever connecting seat and the middle rear lever connecting seat are fixedly installed on the front and rear sides of the magnetic isolation block, respectively; the middle front short lever support, the middle front long lever support, the middle rear short lever support and the middle rear long lever support are installed in corresponding positions of the middle front short lever, the middle front long lever, the middle rear short lever and the middle rear long lever, respectively; and the middle front lever support seat and the middle rear lever support seat are installed under the middle front short lever support and the middle front long lever support, and the middle rear short lever support and the middle rear long lever support, respectively, to play a support role.

5. The magnetic suspension type quasi-zero stiffness electromagnetic vibration isolator according to claim 4, wherein the right electromagnet assembly comprises a right electromagnet fixing seat, a right shaft fixing sleeve, a right guide shaft, two right electromagnet support springs, a right linear bearing, a right electromagnet adjusting seat, a right front lever support seat, a right front short lever support, a right front long lever support, a right front short lever, a right front long lever, a right front lever connecting seat, a right front straight rod, a right front straight rod footstock, a right DIESOLE type electromagnet, a right rear straight rod footstock, a right rear straight rod, a right rear long lever, a right rear short lever, a right rear lever connecting seat, a right rear short lever support, a right rear long lever support and a right rear lever support seat;

the right DIESOLE type electromagnet comprises a right electromagnet core, a right electromagnet outer coil, a right electromagnet inner coil and a right magnetorheological elastomer;

the right electromagnet fixing seat is installed on the base; the right shaft fixing sleeve is installed on the right electromagnet fixing seat; the right guide shaft is installed in the right shaft fixing sleeve; the right electromagnet adjusting seat is installed under the right DIESOLE type electromagnet; the right linear bearing is installed on the right electromagnet adjusting seat and is matched with the right guide shaft; the two right electromagnet support springs are installed between the right electromagnet fixing seat and the right electromagnet adjusting seat and are symmetrical about the right guide shaft; the right front straight rod footstock and the right rear straight rod footstock are installed at the front and rear of the right side under the support plate, respectively; one ends of the right front straight rod and the right rear straight rod are connected with the right front straight rod footstock and the right rear straight rod footstock, respectively; the other ends of the right front straight rod and the right rear straight rod are connected with one ends of the right front short lever and the right rear short lever, respectively; the other ends of the right front short lever and the right rear short lever are connected with one ends of the right front long lever and the right rear long lever, respectively; the other ends of the right front long lever and the right rear long lever are connected with the right front lever connecting seat and the right rear lever connecting seat, respectively; the right front lever connecting seat and the right rear lever connecting seat are fixedly installed on the front and rear sides of the right DIESOLE type electromagnet, respectively; the right front short lever support, the right front long lever support, the right rear short lever support and the right rear long lever support are installed in corresponding positions of the right front short lever, the right front long lever, the right rear short lever and the right rear long lever, respectively; and the right front lever support seat and the right rear lever support seat are installed under the right front short lever support and the right front long lever support, and the right rear short lever support and the right rear long lever support to play a support role, respectively.

6. The magnetic suspension type quasi-zero stiffness electromagnetic vibration isolator according to claim 5, wherein the spring assembly comprises four spring lower locating sleeves, four bearing springs, four spring upper locating sleeves, a middle-layer plate, four support columns, a middle-layer plate linear bearing, a finely-adjusted spring, a finely-adjusted spring pressure plate and a finely-adjusted nut; and the four spring lower locating sleeves are symmetrically installed at the periphery above the bottom plate separately; the four spring upper locating sleeves are symmetrically installed at the periphery under the middle-layer plate separately and correspond to the four spring lower locating sleeves; the four bearing springs are disposed between the corresponding four spring lower locating sleeves and four spring upper locating sleeves, respectively; the four support columns are separately installed at the periphery above the middle-layer plate; the middle-layer plate linear bearing is installed under the middle-layer plate and is matched with the middle guide shaft; the finely-adjusted spring is disposed on a middle locating column of the middle-layer plate; the spring pressure plate is disposed above the finely-adjusted spring; the finely-adjusted nut is disposed above the spring pressure plate and is in threaded fit with the middle guide shaft; and when an overall height of a system is adjusted, a hexagonal hole at an upper part of the finely-adjusted nut is rotated by a wrench.

* * * * *